United States Patent
Shen et al.

(10) Patent No.: US 9,600,324 B2
(45) Date of Patent: Mar. 21, 2017

(54) SYSTEM AND METHOD FOR SUPPORTING TRANSACTION AFFINITY BASED ON RESOURCE MANAGER (RM) INSTANCE AWARENESS IN A TRANSACTIONAL ENVIRONMENT

(71) Applicant: Oracle International Corporation, Redwood Shores, CA (US)

(72) Inventors: Xugang Shen, Beijing (CN); Qingsheng Zhang, Beijing (CN); Todd J. Little, Palatine, IL (US); Yongshun Jin, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/587,476

(22) Filed: Dec. 31, 2014

(65) Prior Publication Data

US 2015/0309835 A1 Oct. 29, 2015

Related U.S. Application Data

(60) Provisional application No. 61/985,135, filed on Apr. 28, 2014.

(51) Int. Cl.
*G06F 9/46* (2006.01)
*H04L 29/08* (2006.01)

(52) U.S. Cl.
CPC .............. *G06F 9/466* (2013.01); *G06F 9/467* (2013.01); *H04L 67/10* (2013.01)

(58) Field of Classification Search
CPC ........... G06F 9/466; G06F 9/467; H04L 67/10

USPC ........................................................ 718/101
See application file for complete search history.

(56) References Cited

U.S. PATENT DOCUMENTS

| | | | |
|---|---|---|---|
| 5,283,897 A * | 2/1994 | Georgiadis | G06F 9/5083 711/151 |
| 6,182,086 B1 | 1/2001 | Lomet | |
| 6,209,018 B1 | 3/2001 | Ben-Shachar | |
| 6,209,038 B1 * | 3/2001 | Bowen | H04L 67/1027 709/237 |
| 6,424,992 B2 * | 7/2002 | Devarakonda | H04L 67/1008 370/237 |

(Continued)

OTHER PUBLICATIONS

Oracle, "Effective Resource Management Using Oracle Database Resource Manager," 2011, last retrieved from www.oracle.com/technetwork/articles/servers-storage-admin/o11-056-oracledb-rm-419380.pdf on Feb. 20, 2016.*

(Continued)

*Primary Examiner* — Wei Zhen
*Assistant Examiner* — Andrew M Lyons
(74) *Attorney, Agent, or Firm* — Tucker Ellis LLP

(57) ABSTRACT

A system and method can support transaction processing in a transactional environment. A transactional system operates to route a request to a transactional server, wherein the transactional server is connected to a resource manager (RM) instance. Furthermore, the transactional system can assign an affinity context to the transactional server, wherein the affinity context indicates the RM instance that the transactional server is associated with, and the transactional system can route one or more subsequent requests that are related to the request to the transactional server based on the affinity context.

13 Claims, 20 Drawing Sheets

(56) References Cited

U.S. PATENT DOCUMENTS

| | | | |
|---|---|---|---|
| 6,560,609 B1* | 5/2003 | Frey | G06F 9/465 |
| 6,671,686 B2 | 12/2003 | Pardon | |
| 6,745,387 B1 | 6/2004 | Ng | |
| 6,799,172 B2* | 9/2004 | Candee | G06F 17/30008 |
| 6,823,514 B1 | 11/2004 | Degenaro | |
| 6,922,724 B1 | 7/2005 | Freeman | |
| 6,981,256 B2 | 12/2005 | Jawahar | |
| 7,284,018 B1 | 10/2007 | Waldorf | |
| 7,337,441 B2 | 2/2008 | Felt | |
| 7,376,953 B2* | 5/2008 | Togasaki | H04L 29/06 709/219 |
| 7,389,514 B2 | 6/2008 | Russell | |
| 7,584,474 B2 | 9/2009 | Gondi | |
| 7,640,545 B2 | 12/2009 | Kumar | |
| 7,676,810 B2 | 3/2010 | Tankov | |
| 7,814,065 B2* | 10/2010 | Chan | G06F 11/2033 707/674 |
| 7,937,611 B2 | 5/2011 | Gatev | |
| 7,996,837 B2 | 8/2011 | Chesebro | |
| 8,001,546 B2 | 8/2011 | Felt | |
| 8,131,872 B2* | 3/2012 | Kennedy | H04L 45/02 709/241 |
| 8,336,053 B2 | 12/2012 | Burghard | |
| 8,391,295 B2 | 3/2013 | Colrain et al. | |
| 8,433,809 B2* | 4/2013 | Dor | G06F 9/5033 709/227 |
| 8,499,298 B2* | 7/2013 | Mitchell | G06F 9/466 718/101 |
| 8,578,390 B2 | 11/2013 | Dillow | |
| 8,635,185 B2* | 1/2014 | Somogyi | G06F 17/30575 707/613 |
| 8,898,277 B2* | 11/2014 | Chen | G06F 11/3495 702/186 |
| 9,027,026 B2 | 5/2015 | Zhelev | |
| 2003/0046258 A1* | 3/2003 | Candee | G06F 17/30008 |
| 2003/0050972 A1* | 3/2003 | Felt | G06Q 30/06 709/203 |
| 2003/0177182 A1* | 9/2003 | Clark | G06F 9/5033 709/203 |
| 2007/0030853 A1* | 2/2007 | Rogers | H04L 41/5009 370/395.21 |
| 2008/0177879 A1* | 7/2008 | Krishnan | H04L 41/0896 709/226 |
| 2008/0243865 A1* | 10/2008 | Hu | G06F 17/30575 |
| 2009/0157766 A1 | 6/2009 | Shen | |
| 2009/0172689 A1 | 7/2009 | Bobak | |
| 2009/0235255 A1* | 9/2009 | Hu | G06F 9/466 718/101 |
| 2009/0296711 A1 | 12/2009 | Kennedy | |
| 2011/0231510 A1 | 9/2011 | Korsunsky | |
| 2012/0005330 A1* | 1/2012 | Moran | G06F 9/466 709/224 |
| 2012/0047394 A1 | 2/2012 | Jain | |
| 2012/0246220 A1 | 9/2012 | Wang | |
| 2012/0284723 A1* | 11/2012 | Burgess | G06F 9/466 718/101 |
| 2013/0024863 A1* | 1/2013 | Parkinson | G06F 9/466 718/101 |
| 2013/0054600 A1 | 2/2013 | Somogyi | |
| 2013/0086238 A1 | 4/2013 | Li | |
| 2013/0246368 A1 | 9/2013 | Parkinson | |
| 2013/0246379 A1* | 9/2013 | Shen | G06F 9/466 707/703 |
| 2015/0149835 A1 | 5/2015 | Jayaraman | |
| 2016/0062854 A1 | 3/2016 | Allen | |

OTHER PUBLICATIONS

Harizopoulos, Stavros and Ailamaki, Anastassia, "Affinity Scheduling in Staged Server Architectures," Mar. 2002, last retrieved from http://www.pdl.cmu.edu/PDL-FTP/Database/CMU-CS-02-113.ps. On Oct. 13, 2016.*

Lundhild et al., "Best Practices for Using XA with RAC," Oracle, 2006, last retrieved from http://www.oracle.com/technetwork/database/enterprise-edition/bestpracticesforxaandrac-128676.pdf on Oct. 13, 2016.*

International Searching Authority At the European Patent Office, International Search Report and Written Opinion for PCT International Patent Application No. PCT/US2015/023120, Jun. 22, 2015, 8 pages.

Mariela Curiel et al., "Modeling Overhead in Servers with Transactional Workloads", IEEE 1999, pp. 182-189.

H. Shrikumar, "Transactional Filer for Grid Storage Server", IEEE © 2005, pp. 422-431.

United States Patent and Trademark Office, Office Action Dated Apr. 11, 2016 for U.S. Appl. No. 14/603,108, 19 Pages.

Oracle, Fusion Middleware, "Achieving High Availability With Oracle Tuxedo" Jul. 2012 retrieved Apr. 18, 2016 from: <http://www.oracle.com/technetwork/middleware/tuxedo/overview/tuxedo-ha-wp-2008-130747.pdf>.

Oracle, Fusion Middleware, "Load Balancing in Oracle Tuxedo ATMI Applications", Jul. 2012 retrieved Apr. 18, 2016 from: <http://www.oracle.com/technetwork/middleware/tuxedo/overview/ld-balc-in-oracle-tux-atmi-apps-1721269.pdf>.

Sangman Kim et al., "Improving Server Applications Wtih System Transactions", Copyright © ACM, pp. 15-28.

Francesco Quaglia et al., "Reliability in Three Tier Systems Without Applicaiton Server Coordination and Persistent Messafe Queues", Copyright © 2005, ACM Symposium on Applied Computing, pp. 718-723.

Torsten Grabs et al., "XMLTM: Efficient Transaction Management for XML Documents", Copyright © 2002, ACM, pp. 142-152.

Florian Irmert et al., "Semantics of a Runtime Adaptable Transaction Manager", Copyright © 2009, ACM, pp. 88-96.

Benchaphon Limthanmaphon et al., "Web Service Composition Transaction Management", Copyright © 2004, Australian Computer Society, Inc. Fifteenth Australasian Database Conference (ADC2004), Dunedin, New Zealand, Confereneces in Research and Practice in Information Technology, vol. 27, pp. 171-179.

M. Fazio et al., "Virtual Resource Management Based on Software Transactional Memory", 2011 First International Symposium on Network Cloud Computing and Applications, Copyright © 2011, IEEE, pp. 1-8.

* cited by examiner

SYSTEM AND METHOD FOR SUPPORTING TRANSACTION AFFINITY BASED ON RESOURCE MANAGER (RM) INSTANCE AWARENESS IN A TRANSACTIONAL ENVIRONMENT

CLAIM OF PRIORITY

This application claims priority on U.S. Provisional Patent Application No. 61/985,135, entitled "COMMON TRANSACTION IDENTIFIER (XID) OPTIMIZATION BASED ON DATABASE INSTANCE AWARENESS," by inventors Xugang Shen and Todd Little, filed Apr. 28, 2014, which application is herein incorporated by reference.

CROSS REFERENCE TO RELATED APPLICATIONS

This application is related to the following patent applications, each of which is hereby incorporated by reference in its entirety:

U.S. patent application titled "SYSTEM AND METHOD FOR SUPPORTING RESOURCE MANAGER (RM) INSTANCE AWARENESS IN A TRANSACTIONAL ENVIRONMENT", application Ser. No. 14/587,474, filed Dec. 31, 2014;

U.S. patent application titled "SYSTEM AND METHOD FOR SUPPORTING COMMON TRANSACTION IDENTIFIER (XID) OPTIMIZATION BASED ON RESOURCE MANAGER (RM) INSTANCE AWARENESS IN A TRANSACTIONAL ENVIRONMENT", application Ser. No. 14/587,468, filed Dec. 31, 2014; and U.S. patent application titled "SYSTEM AND METHOD FOR ADAPTIVELY INTEGRATING A DATABASE STATE NOTIFICATION SERVICE WITH A DISTRIBUTED TRANSACTIONAL MIDDLEWARE MACHINE", application Ser. No. 14/603,108, filed Jan. 22, 2015.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

The present invention is generally related to computer systems and software, and is particularly related to a transactional system.

BACKGROUND

A transactional middleware system, or transaction oriented middleware, includes enterprise application servers that can process various transactions within an organization. With the developments in new technologies such as high performance network and multiprocessor computers, there is a need to further improve the performance of transactional middleware. These are the generally areas that embodiments of the invention are intended to address.

SUMMARY

Described herein are systems and methods that can support transaction processing in a transactional environment. A transactional system operates to route a request to a transactional server, wherein the transactional server is connected to a resource manager (RM) instance. Furthermore, the transactional system can assign an affinity context to the transactional server, wherein the affinity context indicates the RM instance that the transactional server is associated with, and the transactional system can route one or more subsequent requests that are related to the request to the transactional server based on the affinity context.

DETAILED DESCRIPTION

Figure 1:
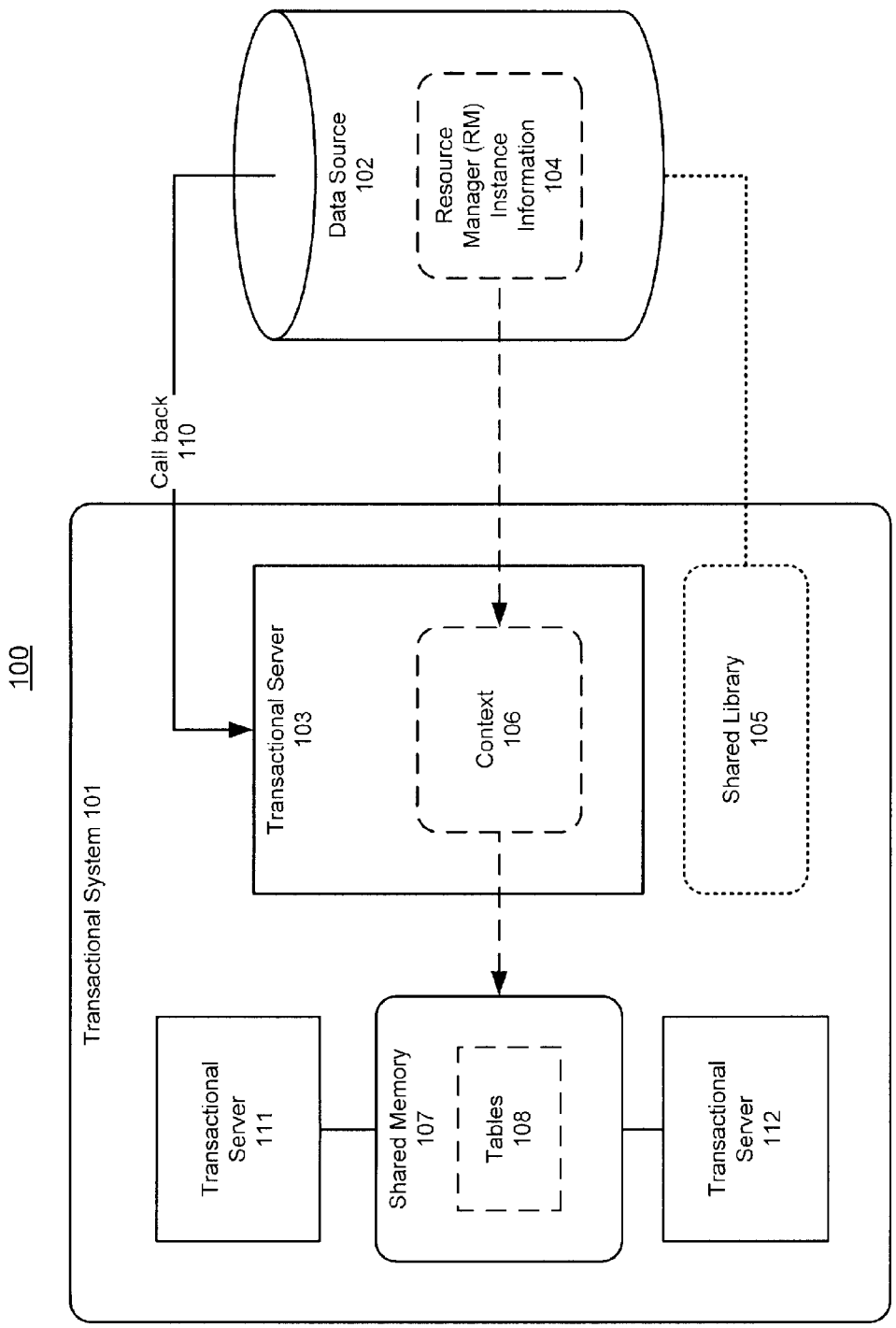
FIG. 1 shows an illustration of supporting resource manager (RM) instance awareness in a transactional environment, in accordance with an embodiment of the invention.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the ORACLE® TUXEDO transactional middleware environment (hereinafter TUXEDO) as an example for a transactional middleware machine environment. It will be apparent to those skilled in the art that other types of transactional middleware machine environments can be used without limitation.

Described herein are systems and methods that can support transaction processing in a transactional environment, such as a transactional middleware machine environment.
Transactional Middleware Machine Environment In accordance with an embodiment of the invention, the system comprises a combination of high performance hardware, e.g. 64-bit processor technology, high performance large memory, and redundant InfiniBand and Ethernet networking, together with an application server or middleware environment, such as ORACLE® WEBLOGIC unified application server software suite, (hereinafter WEBLOGIC) to provide a complete JAVA® EE application server complex which includes a massively parallel in-memory grid, that can be provisioned quickly, and can scale on demand. In accordance with an embodiment, the system can be deployed as a full, half, or quarter rack, or other configuration, that provides an application server grid, storage area network, and InfiniBand (IB) network. The middleware machine software can provide application server, middleware and other functionality such as, for example, WEBLOGIC, JROCKIT JAVA® virtual machine software or HOTSPOT JAVA® virtual machine software (Hotspot JVM), ORACLE® LINUX® operating system software or SOLARIS® operating system software, and Or ORACLE® VM. In accordance with an embodiment, the system can include a plurality of compute nodes, IB switch gateway, and storage nodes or units, communicating with one another via an IB network. When implemented as a rack configuration, unused portions of the rack can be left empty or occupied by fillers.

In accordance with an embodiment of the invention, the system provides an easy-to-deploy solution for hosting middleware or application server software, such as the ORACLE® Middleware SW suite, or WEBLOGIC. As described herein, in accordance with an embodiment the system is a "grid in a box" that comprises one or more servers, storage units, an IB fabric for storage networking, and all the other components required to host a middleware application. Significant performance can be delivered for all types of middleware applications by leveraging a massively parallel grid architecture using, e.g. ORACLE® Real Application Clusters database software and ORACLE® EXALOGIC computing appliance Open storage. The system delivers improved performance with linear I/O scalability, is simple to use and manage, and delivers mission-critical availability and reliability.

In accordance with an embodiment of the invention, a transactional middleware system, such as the ORACLE® TUXEDO system, can take advantage of fast machines with multiple processors, such as an ORACLE® EXALOGIC middleware machine, and a high performance network connection, such as an IB network. Additionally, the ORACLE® TUXEDO system can take advantage of a clustered database, such as the ORACLE® Real Application Clusters (RAC) Enterprise database, which is a clustered database with shared cache architecture and can be a component of a cloud architecture. The ORACLE® RAC can overcome the limitations of traditional shared-nothing and shared-disk approaches to provide highly scalable and available database solutions for business applications.

In accordance with an embodiment of the invention, ORACLE® TUXEDO system provides a set of software modules that enables the construction, execution, and administration of high performance, distributed business applications and has been used as transactional middleware by a number of multi-tier application development tools. TUXEDO is a middleware platform that can be used to manage distributed transaction processing in distributed computing environments. It is a proven platform for unlocking enterprise legacy applications and extending them to a services oriented architecture, while delivering unlimited scalability and standards-based interoperability.

Additionally, the ORACLE® TUXEDO system can comply with the Open Group's X/Open standards, including the support of the XA standard for two-phase commit (2PC) processing, the X/Open ATMI API, and the X/Open Portability Guide (XPG) standards for language internationalization. The transactional application server can be referred to as an XA server, when it uses the XA standard. For example, each TUXEDO application server that belongs to a TUXEDO group can be configured using an OPENINFO property. All XA servers in a TUXEDO group can use the OPENINFO property to establish the connection to a resource manager (RM).
Instance Awareness FIG. 1 shows an illustration of supporting resource manager (RM) instance awareness in a transactional environment, in accordance with an embodiment of the invention. As shown in FIG. 1, a transactional system 101 in a transactional environment 100 can support transaction processing using one or more resource manager (RM) instances associated with a data source 102, such as a database.

In accordance with an embodiment of the invention, the transactional system 101 can be aware of the RM instance information 104 in the data source 102. For example, a transaction server 103 in the transactional system 101 can obtain the RM instance information 104 from the data source 102 by taking advantage of a user callback 110. The transactional system 101 can use different mechanisms for registering the user callback 110, e.g. a static registration mechanism and a dynamic registration mechanism.

The static registration mechanism can be used when a XA server is supported. The XA server is a server that uses the uniform XA interface to control a transaction. For example, in TUXEDO, the static registration can be invoked in the tpopen( ) function after the xa_open( ) function is called. Once the registration is successful, the user callback 110 can be invoked when the transactional server 103 establishes the connection to a database, e.g. an ORACLE® database. Additionally, the user callback 110 can be deregistered in the tpclose( ) function before the xa_close( ) function is called.

Alternatively, the transaction server 103 can dynamically register the user callback 110, e.g. based on a shared library 105 associated with the data source 102. For example, TUXEDO can dynamically register the callback when a user connects to an ORACLE® Database using a non-XA server (e.g. via OCI or Pro*c/c++). TUXEDO can first load ORACLE® OCI library OCI API dynamically and obtain the related OCI environment handle. Then, TUXEDO can register a user callback via an OCIUserCallbackRegister in the OCISessionBegin function.

As shown in FIG. 1, the system can save the obtained instance information 104 in a related context 106 associated with the transactional server 103. Additionally, the transactional server 103 can store the instance information 104 into the different state tables 108 in a shared memory 107 (e.g. the global bulletin board (BB) in TUXEDO). These tables 108 can be synchronized to different nodes, and can be accessed by multiple transactional servers (e.g. servers 111-112) and/or native clients.

Figure 2:
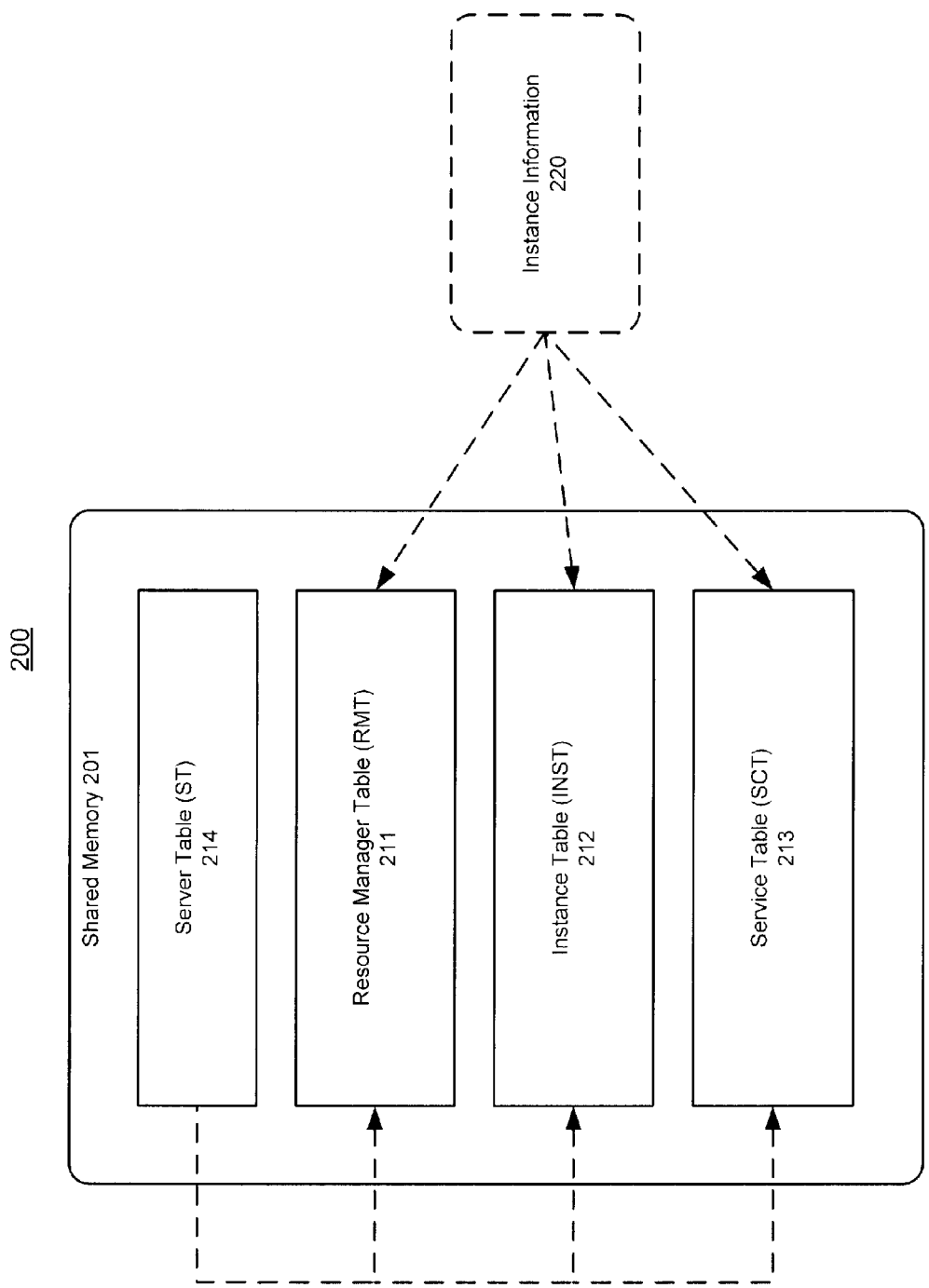
FIG. 2 shows an illustration of maintaining various state tables in a transactional environment, in accordance with an embodiment of the invention.

FIG. 2 shows an illustration of maintaining various state tables in a transactional environment, in accordance with an embodiment of the invention. As shown in FIG. 2, a transactional system 200 can store the instance information 220 into different state tables in a shared memory 201.

These state tables can include a resource manager table 211 that stores unique RM/database names, an instance table 212 that stores the RM/database instance names and a service table 213 that stores the RM/database service names. Such information can help other servers to know the instance information associated with the particular server.

Additionally, the transactional system 200 can maintain a server table (ST) 214 in the shared memory 201. The ST 214 can include one or more sever table entries (STEs), each of which can store an index in the instance table 212. For example, each STE can store an instance identifier (ID) if the server is a single-threaded server.

As shown in FIG. 2, the server table 214 can point to the other tables 211-213 in the shared memory 201. Thus, the transactional system 200 can use the server table 214 to obtain the instance information (such as the information on which RM instance that a particular server is currently connected to), and the transactional system 200 may not use the instance information stored in the different state tables 211-213 directly.

Figure 3:
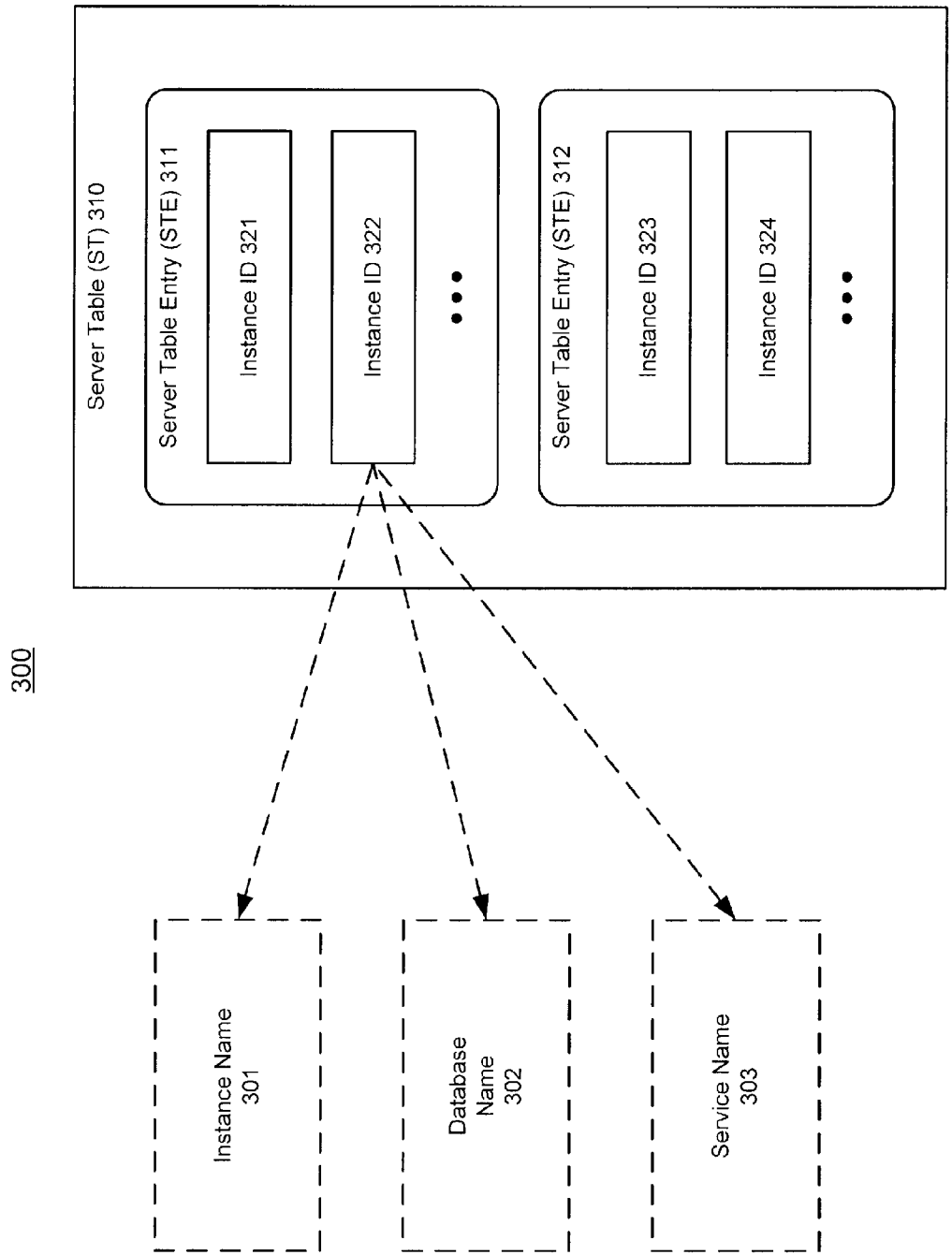
FIG. 3 shows an illustration of supporting a server table (ST) in a transactional environment, in accordance with an embodiment of the invention.

FIG. 3 shows an illustration of supporting a server table (ST) in a transactional environment, in accordance with an embodiment of the invention. As shown in FIG. 3, a server table (ST) 310 in a transactional system 300 can include one or more server table entries (STEs) 311-312, each of which can include one or more instance identifiers (IDs). For example, STE 311 can include instance IDs 321-322, and the STE 312 can include instance IDs 323-324.

In accordance with an embodiment of the invention, each instance ID 321-324 can include various instance information. As shown in FIG. 3, the instance ID 322 can identify an instance name 301, a database name 302, and a service name 303.

For example, the instance ID can be implemented using an integer, e.g. a 32 bit integer that includes three sections: bit 0-11, bit 12-19, and bit 20-31. The first section, bit 0-11, can store the entry index for a RM/database instance name 301. The second section, bit 12-19, can store the entry index for a RM/database name 302. The third section, bit 20-31, can store the entry index for a RM/database service name 303. Additionally, the special value 0xFFFFFFFF can be used for indicating an invalid instance ID.

In accordance with an embodiment of the invention, the transactional system 300 can check the instance information in an instance ID 322 by simply comparing the related bits. Thus, the system can avoid the performance issue due to string comparing, since the string comparing operation is a more expensive than the bit comparing operation.

Figure 4:
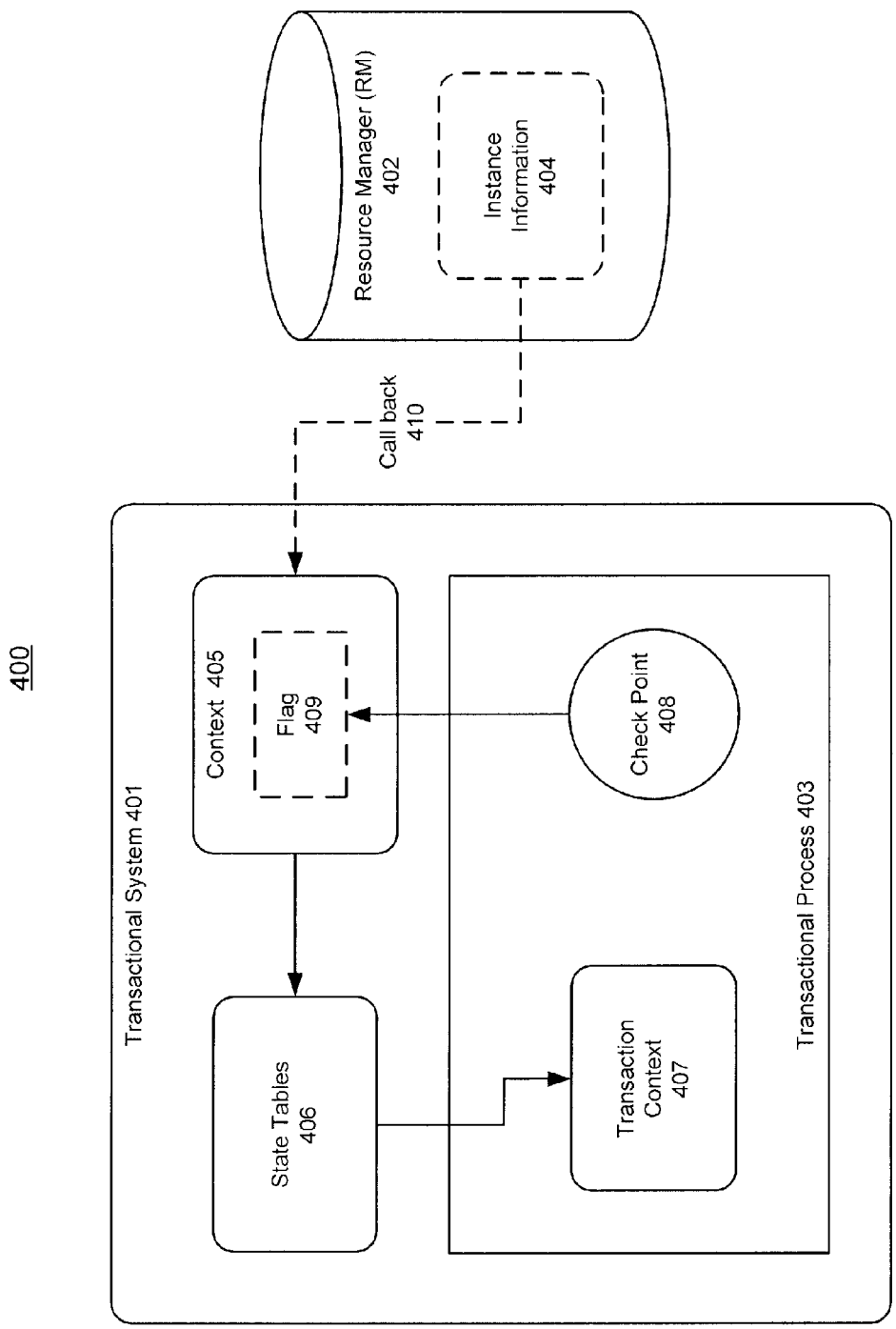
FIG. 4 shows an illustration of updating the instance information in a transactional environment, in accordance with an embodiment of the invention.

FIG. 4 shows an illustration of updating the instance information in a transactional environment, in accordance with an embodiment of the invention. As shown in FIG. 4, a transactional system 401 in a transactional environment 400 can obtain the related instance information 404 from a resource manager (RM) 402, e.g. in a database.

When the user callback 410 is called, the latest instance information 404 can be retrieved from the RM 402 and can be stored into the context 405. Additionally, the transactional system 401 can set a flag 409, which indicates the receiving of the latest instance information 404.

In accordance with an embodiment of the invention a transactional process 403 can be configured with one or more checkpoints. For example, the checkpoints can be triggered before and after the service invocation and after the initialization routine. Also, the check points can be triggered when a connection is established or dropped.

As shown in FIG. 4, at the check point 408, the transactional process 403 can check the flag 409. If the flag 409 is up, the transactional server 403 can update the transaction context 407 based on the retrieved instance information 404, and store the retrieved instance information 404 into the state tables 406 (in a shared memory).

Figure 5:
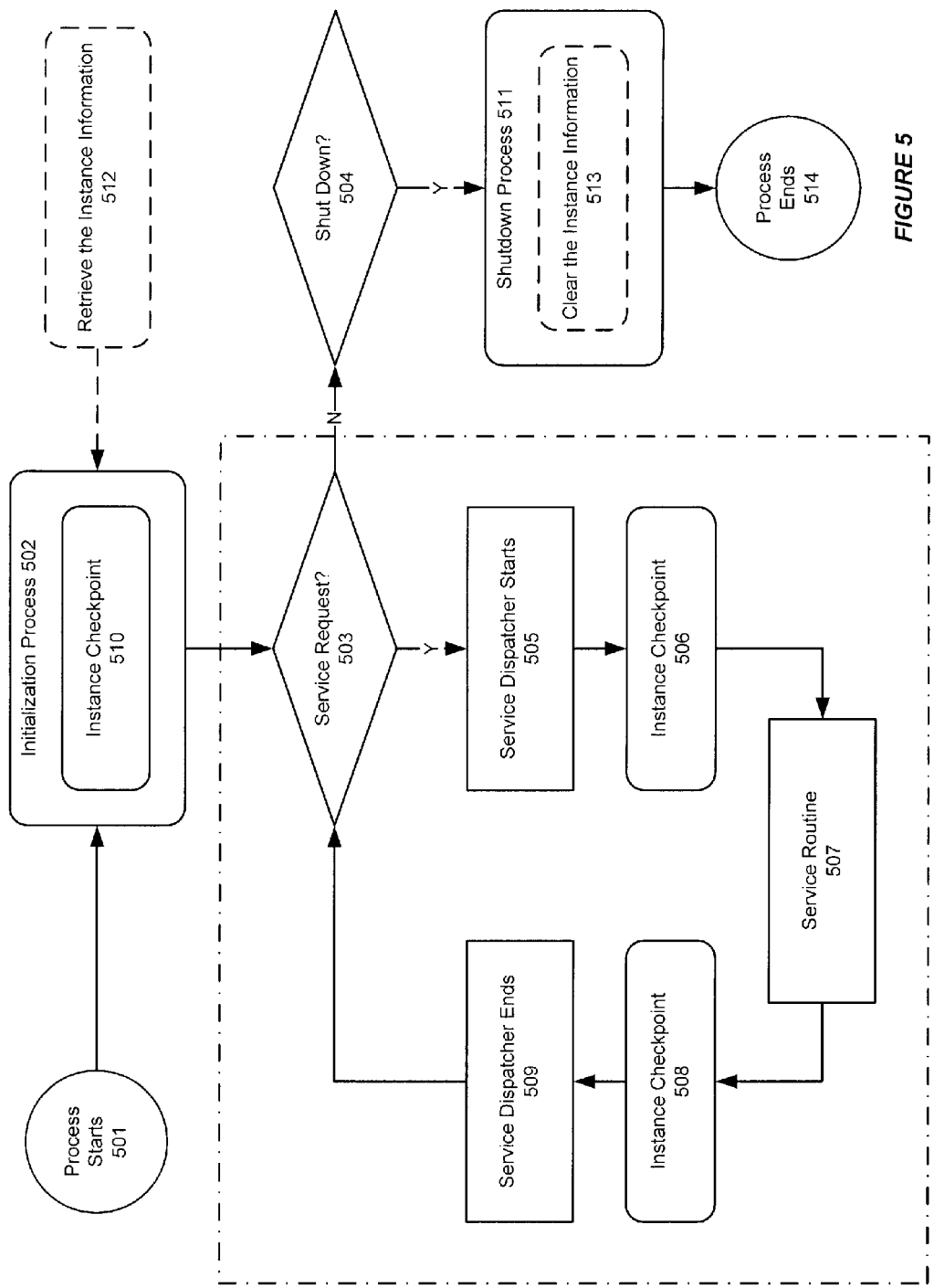
FIG. 5 shows an illustration of supporting a transaction process with various check points in a transactional environment, in accordance with an embodiment of the invention.

FIG. 5 shows an illustration of supporting a transaction process with various check points in a transactional environment, in accordance with an embodiment of the invention. As shown in FIG. 5, at step 501, the transactional process starts. Then, the transactional process can proceed with the initialization process at step 502.

The initialization process 502 can include one or more instance check points, e.g. the check point 510. For example, in TUXEDO, when the dynamic registration is used, the check point 510 may be located in the startup routine of a server after the initialization routine (e.g. tpsvrinit). Also, the check point 510 can be triggered when the server tries to establish a connection to RM (e.g. after the xa_open( ) function call is invoked successfully in the tpopen( ) function call).

Additionally, at step 512, the transactional process can retrieve the instance information to enable the instance awareness capability, during the initialization process 502.

Furthermore, at step 503, the transactional process can check whether there is a service request. At step 505, the transactional process can invoke a service dispatcher, e.g. tmsvcdsp( ). As shown in FIG. 5, a check point 506 can be triggered before the service routine 507 is invoked for processing the request message. Additionally, another check point 508 can be triggered after the service routine 507 is completed. At step 509, the transactional process can end the service dispatcher.

Otherwise, if there is no service request and the transactional process is to be shut down, at step 504, the transactional process can start the shutdown process 511. The shutdown process 511 can trigger a check point 513 to clean instance ID information. For example, in TUXEDO, the check point 513 can be triggered when the server is to close a connection to the RM (e.g. before a xa_close( ) function call is invoked in a tpclose( ) function call). Finally, the transactional process ends at step 514.

In accordance with an embodiment of the invention, when the system uses the static registration instead of dynamic registration, the system may behave differently at the check point 512 and the check point 513. The instance information can be retrieved and updated directly without checking the initiator. For example, when the static registration is used, a XA server can use the tpopen( )/tpclose( ) function calls to establish/delete the connections to a RM. Also, the tpopen( ) function can be called in the customized tpsvrinit( ) function call, and the tpclose( ) function can be called in the customized tpsvrdone( ) function.

Figure 6:
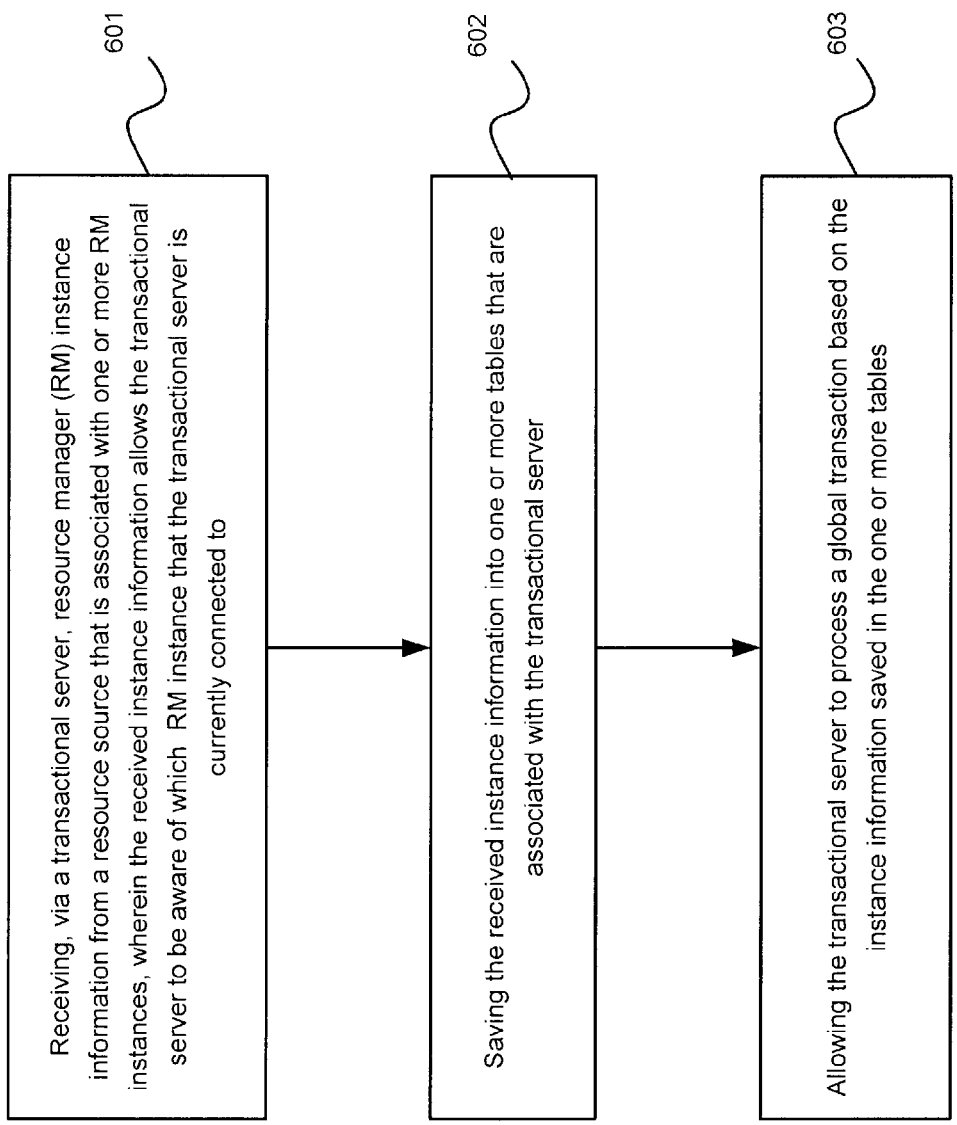
FIG. 6 illustrates an exemplary flow chart for supporting resource manager (RM) instance awareness in a transactional environment, in accordance with an embodiment of the invention.

FIG. 6 illustrates an exemplary flow chart for supporting resource manager (RM) instance awareness in a transactional environment, in accordance with an embodiment of the invention. As shown in FIG. 6, at step 601, a transactional server can receive resource manager (RM) instance information from a resource source that is associated with one or more RM instances, wherein the received instance information allows the transactional server to be aware of which RM instance that the transactional server is currently connected to. Then, at step 602, the system can save the received instance information into one or more tables that are associated with the transactional server. Furthermore, at step 603, the system allows the transactional server to process a global transaction based on the instance information saved in the one or more tables.

Transaction Affinity

Figure 7:
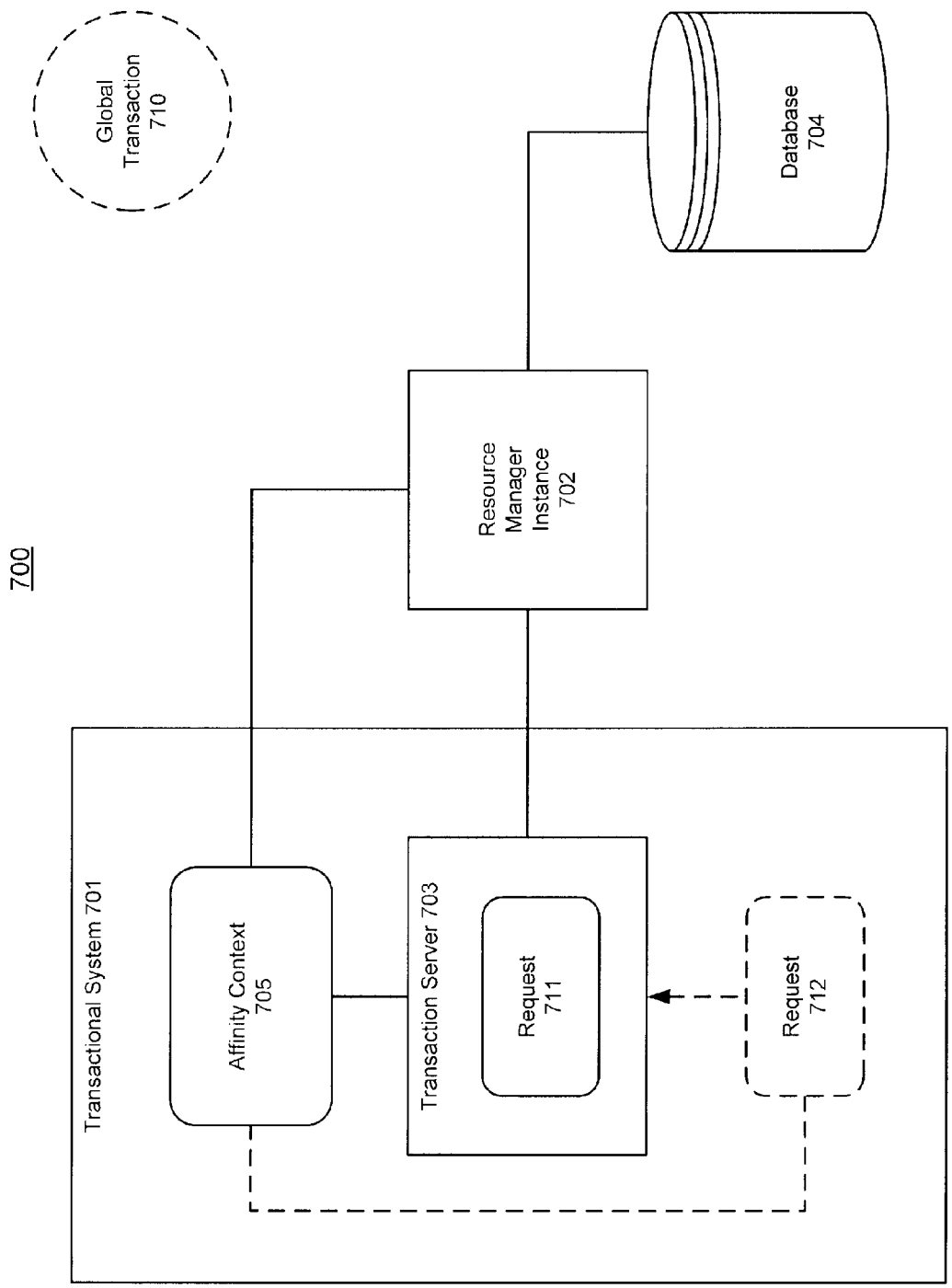
FIG. 7 shows an illustration of supporting transaction affinity based on instance awareness in a transactional environment, in accordance with an embodiment of the invention.

FIG. 7 shows an illustration of supporting transaction affinity based on instance awareness in a transactional environment, in accordance with an embodiment of the invention. As shown in FIG. 7, a transactional environment 700 can support the processing of a global transaction 710 using one or more resource managers (RMs), e.g. a RM instance 702 that is associated with a database 704.

The transactional system 701 can route a request 711 for a database connection to a transactional server 703 (e.g. using the default routing policy). Additionally, the system can assign an affinity context 705 to the transactional server 703. The affinity context 705, which contains information identifying the RM instance 702, can be stored in a shared memory (e.g. a global transaction table (GTT) in TUXEDO) and can be propagated using a message. For example, the transactional server 703 can obtain the RM instance name, the RM/database name and the RM/database service name, via the affinity context 705 based on the above instance awareness feature.

Furthermore, a subsequent request 712 can be routed to the transactional server 703 based on the affinity context 705. Additionally, other subsequent requests can also be routed to the transactional server 703, which is connected to the RM instance 702, until the global transaction 710 is completed (or the client context ends).

In accordance with an embodiment of the invention, the transaction affinity ensures that the related database requests 711-712, which are connected to the RM instance 702, can be routed to the same transactional server 703. Thus, the transaction affinity can improve application performance by maximizing the database cluster utilization, since the transaction affinity can improve database performance by increasing the likelihood of cache hits.

Figure 8:
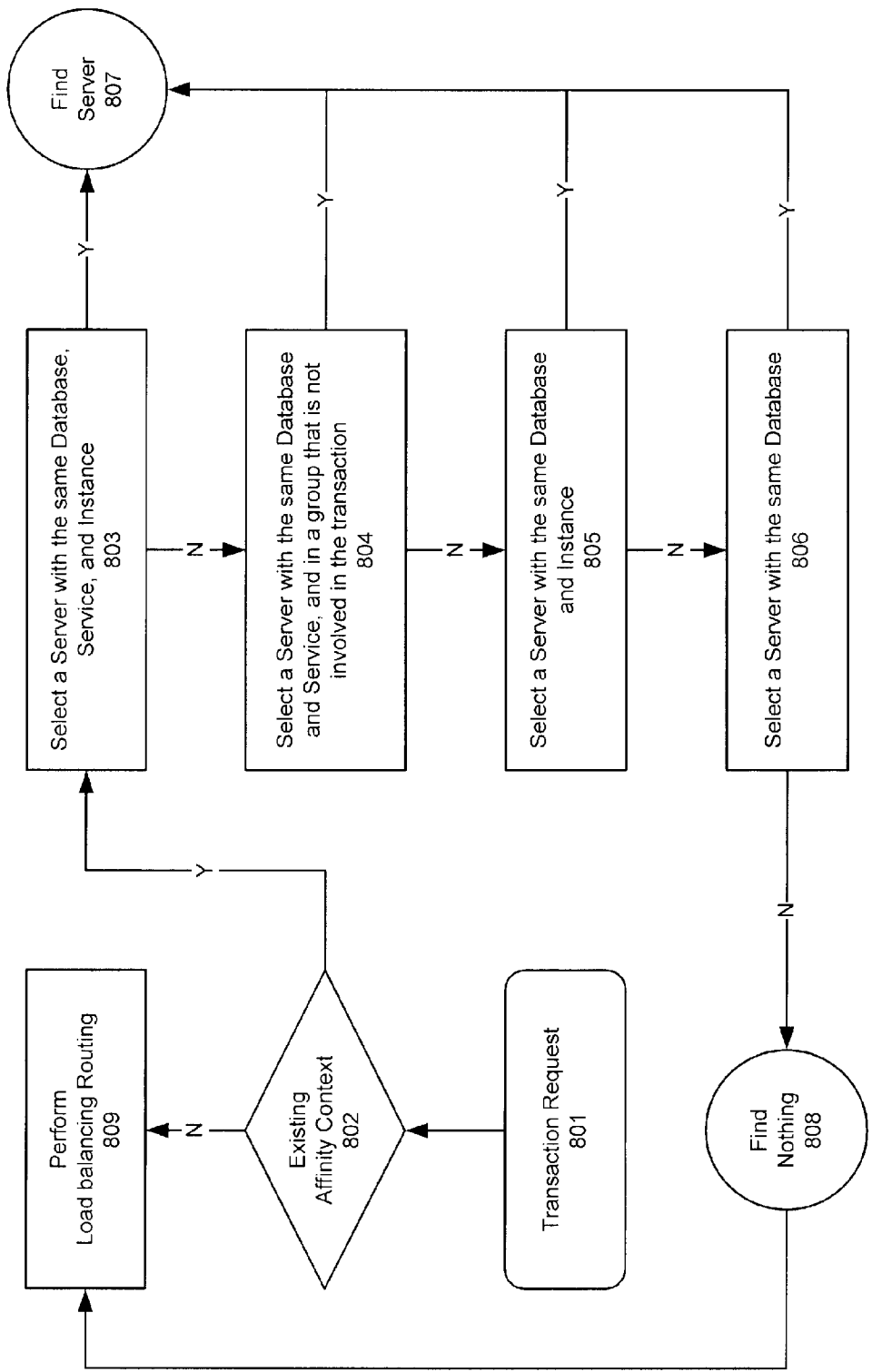
FIG. 8 shows an illustration of supporting the transaction affinity routing in a transactional environment, in accordance with an embodiment of the invention.

In accordance with an embodiment of the invention, the system can apply the transaction affinity routing policy along with other routing polices for performing the global transaction 710. For example, the following routing precedence can be supported in TUXEDO:

1. Transaction precedence routing for domain
2. Client/server affinity routing
3. Transaction affinity routing
4. Load balancing according to service load FIG. 8 shows an illustration of supporting the transaction affinity routing in a transactional environment, in accordance with an embodiment of the invention. As shown in FIG. 8, a transactional system can support the processing of a global transaction using a transaction affinity routing policy.

At step 801, the system can receive a transaction request that involves a database connection. Then, at step 802, the system can check whether there are existing affinity contexts.

If no affinity context is involved in the global transaction, the system can perform the load balancing routing, at step 809.

If there are existing affinity contexts involved in the global transaction, the system can apply the transaction affinity routing policy in order to find a server.

At step 803, the system may try to find a server, which is associated with the same instance name, the same database (DB) name and the same service name.

If the system cannot find the server, at step 804, the system may try to find a server, which is associated with the same DB name and the same service name and is in a group that is not involved in the current global transaction.

If the system cannot find the server, at step 805, the system may try to find a server, which is associated with the same DB name and the same instance name.

If the transactional system cannot find the server, at step 806, the system may try to find a server, which is associated with the same DB name.

At step 807, the system may be able to find a server based on the existing affinity contexts. On the other hand, at step 808, the system may not be able to find a server. Then, at step 809, the system can try to find the server according to the load balancing routing.

Figure 9:
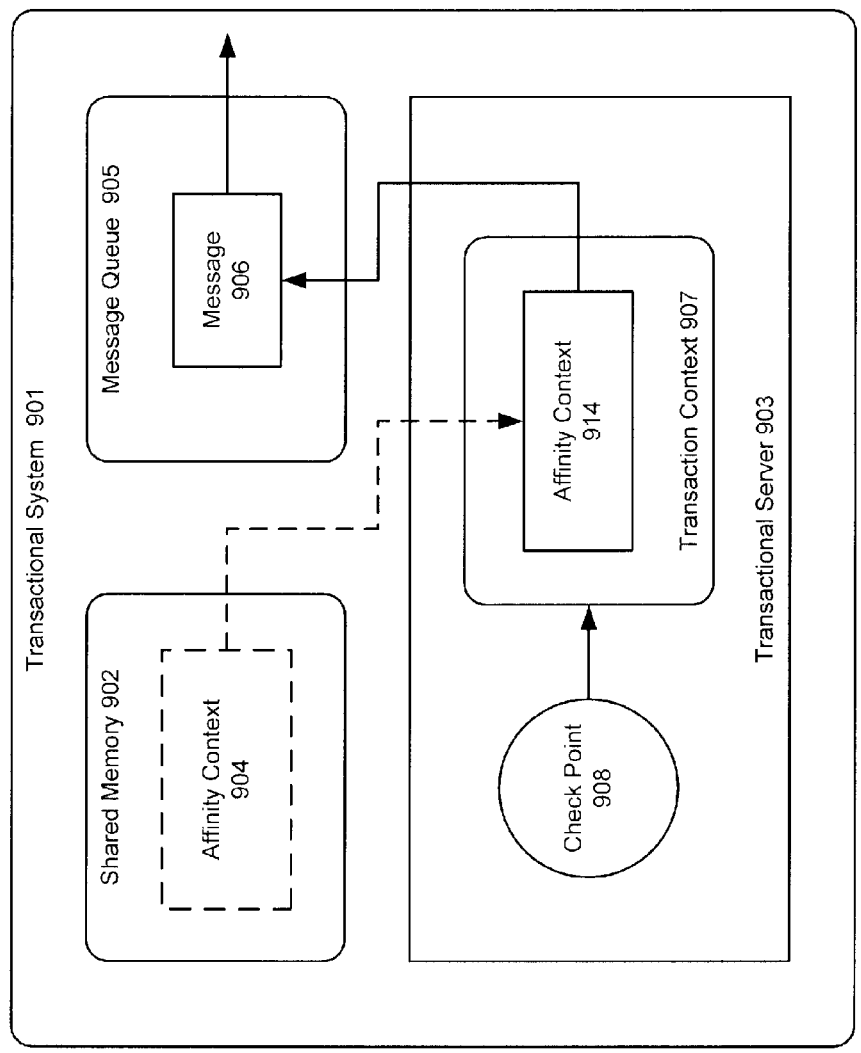
FIG. 9 shows an illustration of sending a message with an affinity context in a transactional environment, in accordance with an embodiment of the invention.

FIG. 9 shows an illustration of sending a message with an affinity context in a transactional environment, in accordance with an embodiment of the invention. As shown in FIG. 9, a transactional system 901 can support the transaction processing in a transaction environment 900. Furthermore, a transactional server 903 in a transactional system 901 can support the transaction processing based on a transaction context 907 (e.g. TUXC in TUXEDO).

As shown in FIG. 9, the transactional server 903 can obtain the related affinity context 904 from a shared memory 902 (e.g. GTT in TUXEDO), and can update the transaction context 907 using the related affinity context 914. When the checkpoint 908 is triggered, the system can copy the related affinity context 914 from the transaction context 907 into a message 906 in the message queue 905.

Thus, the transactional system 901 can refer to the related affinity context 914 in the transaction context 907 for service routing, before sending the message 906 to a service.

Figure 10:
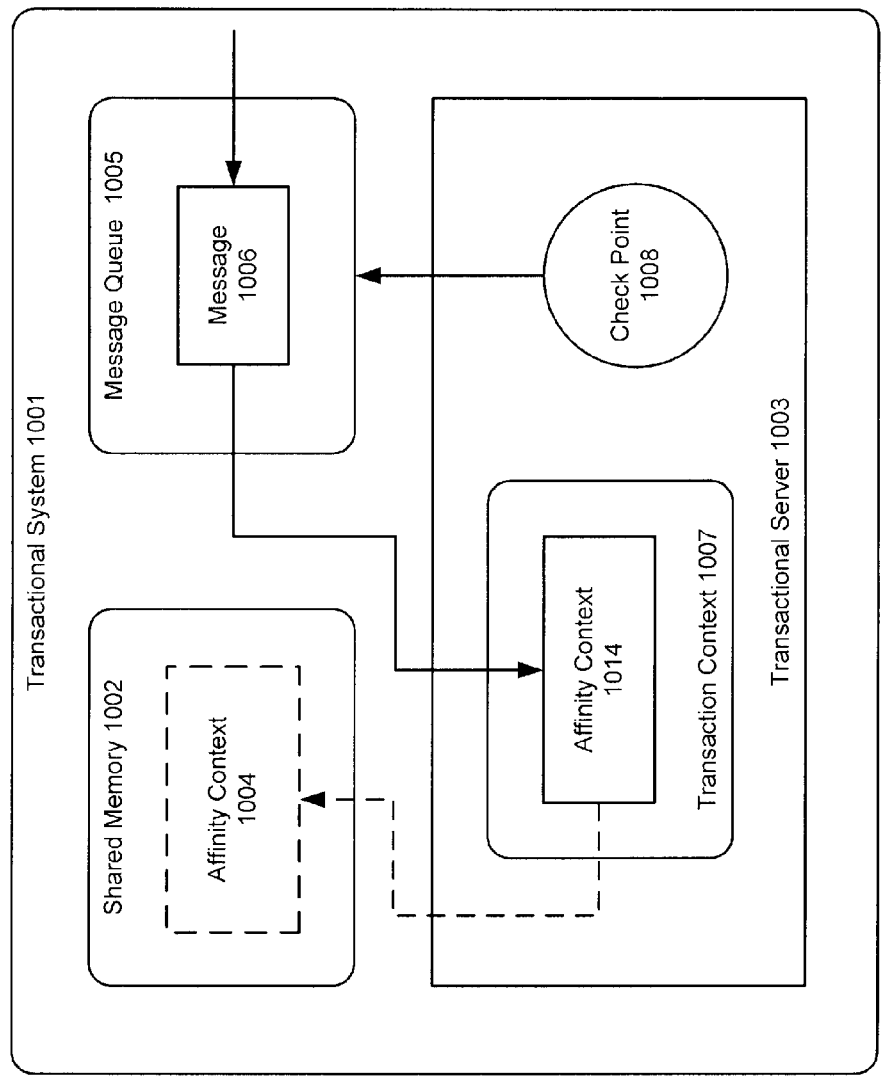
FIG. 10 shows an illustration of receiving a message with affinity context in a transactional environment, in accordance with an embodiment of the invention.

FIG. 10 shows an illustration of receiving a message with affinity context in a transactional environment, in accordance with an embodiment of the invention. As shown in FIG. 10, a transactional system 1001 in a transactional environment 1000 can use a message queue 1005 for receiving one or more messages (e.g. a message 1006).

A transactional server 1003 in the transactional system 1001 can continuously dequeue messages (containing requests) after the initial boot. As shown in FIG. 10, the transactional server 1003 can read the message 1006 from the message queue 1005 and processes a service request in the message 1006.

During the processing of the service request, the system can trigger a checkpoint 1008 for copying the affinity context from the message 1006 into the transaction context 1007. Then, the system can use the affinity context 1014 in the transaction context 1007 to update the affinity context 1004 in the shared memory 1002.

Once the request in the message 1006 has been processed, the transactional server 1003 process can read more messages from message queue 1005. Otherwise, the transactional server 1003 can wait on the message queue 1005 until the next request arrives.

Figure 11:
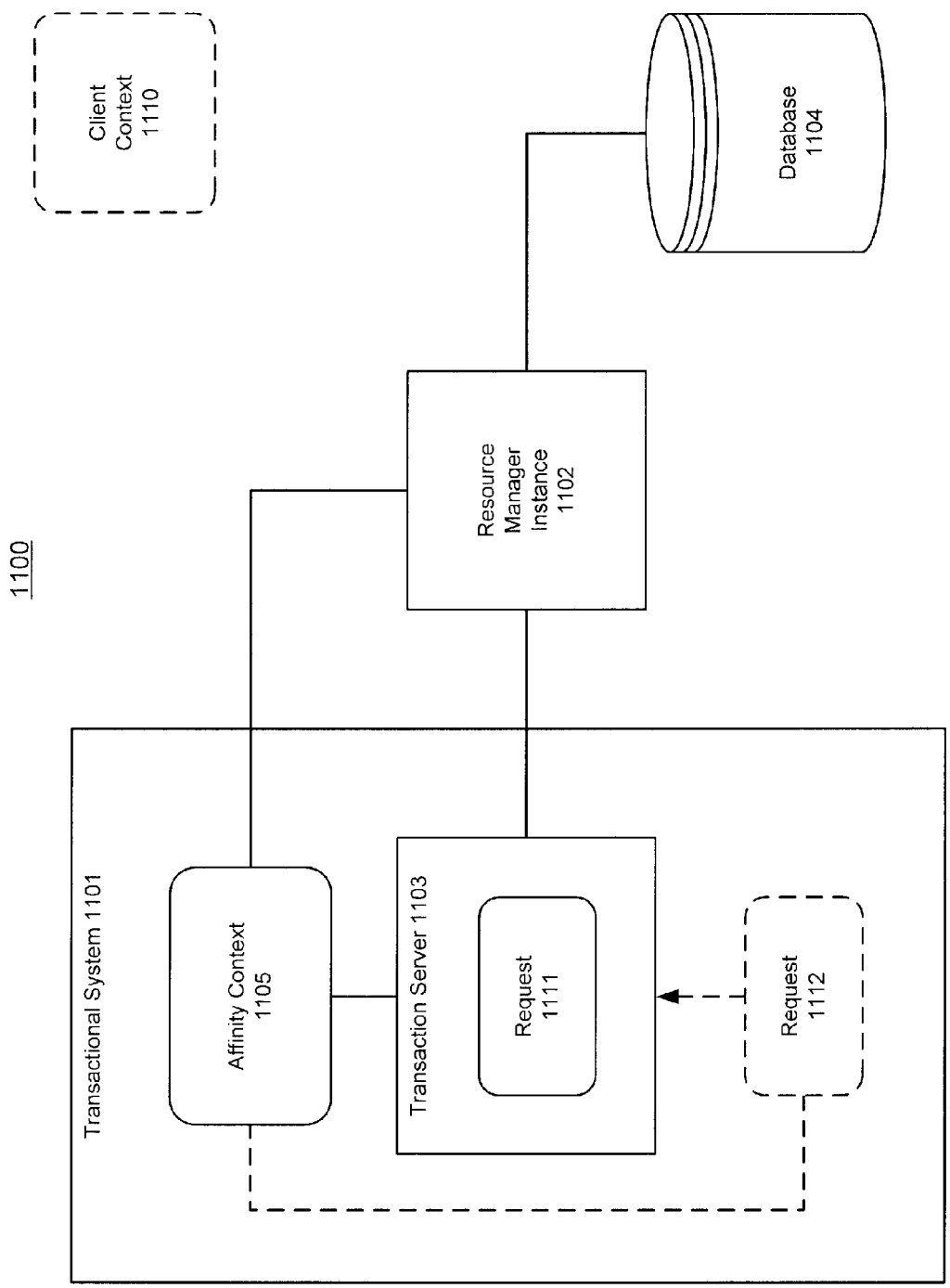
FIG. 11 shows an illustration of supporting affinity routing within a client context in a transactional environment, in accordance with an embodiment of the invention.

FIG. 11 shows an illustration of supporting affinity routing within a client context in a transactional environment, in accordance with an embodiment of the invention. As shown in FIG. 11, a transactional system 1101 in a transactional environment 1100 can support the transaction processing in a client context 1110 using one or more resource manager (RMs), e.g. a RM instance 1102 that is associated with a database 1104. For example, within the client context 1110, web conversations can be connected and disconnected for a number of times. During each of these connections, the conversation may refer to and/or access the same (or similar) data, such as a shopping cart.

In accordance with an embodiment of the invention, the system can route a request 1111 for a database connection to a transactional server 1103 (e.g. based on the default routing policy). Additionally, the system can assign an affinity context 1105 that indicates the RM 1102 to the transactional server 1103.

Furthermore, one or more subsequent requests within the client context 1110 (e.g. the request 1112) can be routed to the transactional server 1103, based on the affinity context 1105 until the client context 1110 ends or the related transaction completes. Thus, the transactional system 1101 can ensure that the various database operations within the client context 1110 can be directed to the same RM instance 1102.

In accordance with an embodiment of the invention, the transactional system 1101 can receive various load balance advisory events from the database, which hints for an affinity within the client context 1110. For example, in TUXEDO, the load balancing advisory event received from a database can include a parameter, AFFINITY HINT, which is a flag that indicates whether affinity is active or inactive for a particular instance and service combination. The AFFINITY HINT parameter, which is a temporary affinity that lasts for the duration of a web session, can be automatically enabled when load balancing advisory is enabled by setting the goal on the service. Additionally, different instances offering the same service can have different settings for AFFINITY HINT.

In accordance with an embodiment of the invention, the transactional system 1101 may apply the transaction affinity routing policy, instead of the client context based affinity policy, if related database operations are within a transaction. On the other hand, the system can implement the client context based affinity routing policy, based on the default TUXEDO load balance route policy.

Figure 12:
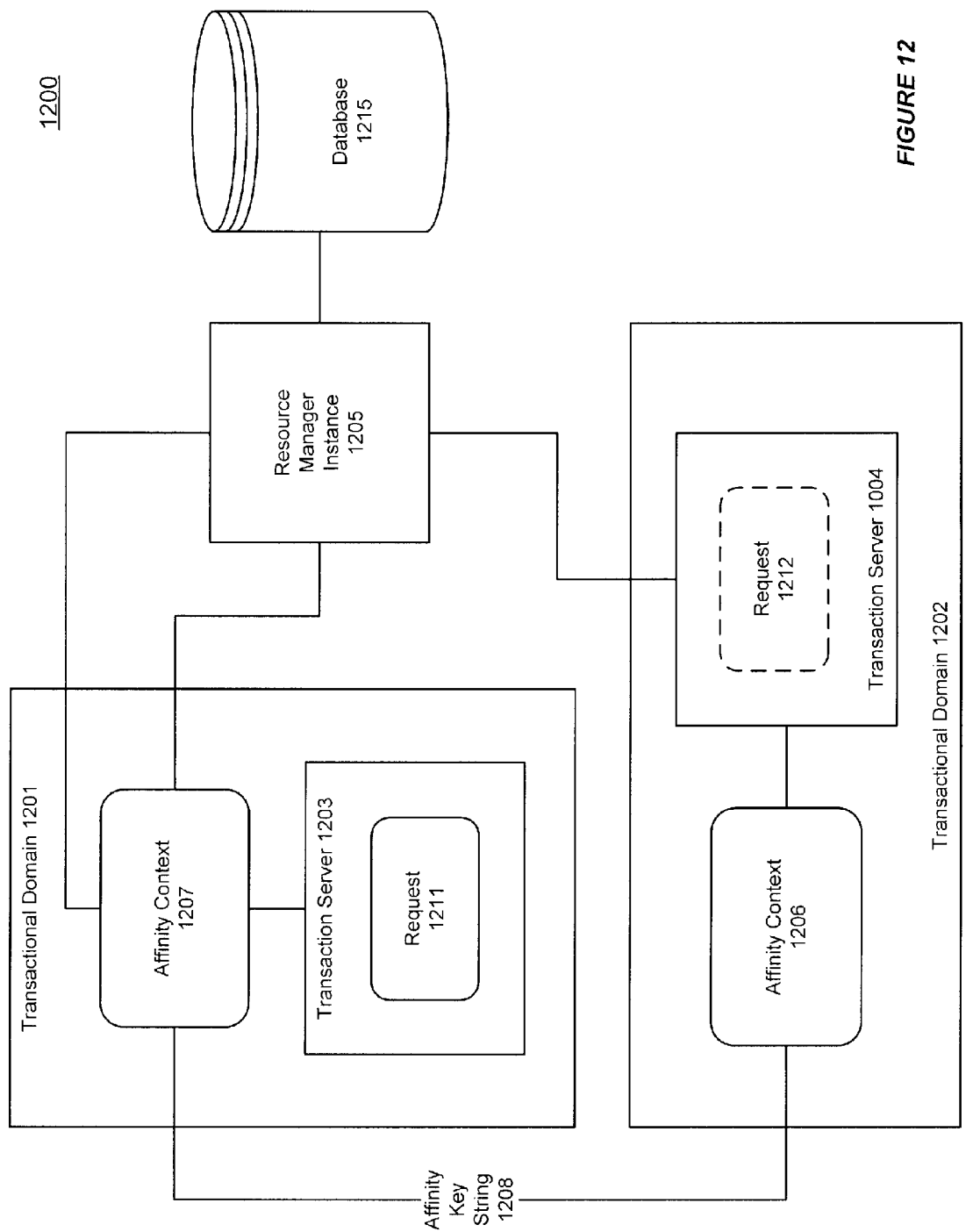
FIG. 12 shows an illustration of propagating an affinity context across different domains in a transactional environment, in accordance with an embodiment of the invention.

FIG. 12 shows an illustration of propagating an affinity context across different domains in a transactional environment, in accordance with an embodiment of the invention. As shown in FIG. 12, a transactional environment 1200 can support the transaction processing using one or more resource managers (RMs), e.g. a RM instance 1205 that is associated with a database 1215.

In accordance with an embodiment of the invention, the system can route a request 1211 for a database connection to a transactional server 1203 (e.g. using the default routing policy). Additionally, the system can assign an affinity context 1207 that indicates the RM instance 1205 to the transactional server 1203.

Furthermore, a transactional domain in the transactional environment 1200 can propagate affinity context information across domains, if the request 1211 is to be transferred between different domains.

As shown in FIG. 12, the transaction domain 1201 can translate the affinity context 1207 into an affinity key string 1208 before sending the affinity key string 1208 to the remote domain 1202. After receiving the affinity key string 1208, the transaction domain 1202 can translate the affinity key string 1208 into the affinity context 1206 that can be used by a transactional server 1004 in the transaction domain 1202.

Thus, one or more subsequent requests (e.g. the request 1212) can be directed to the RM instance 1202 based on the affinity context 1206.

Figure 13:
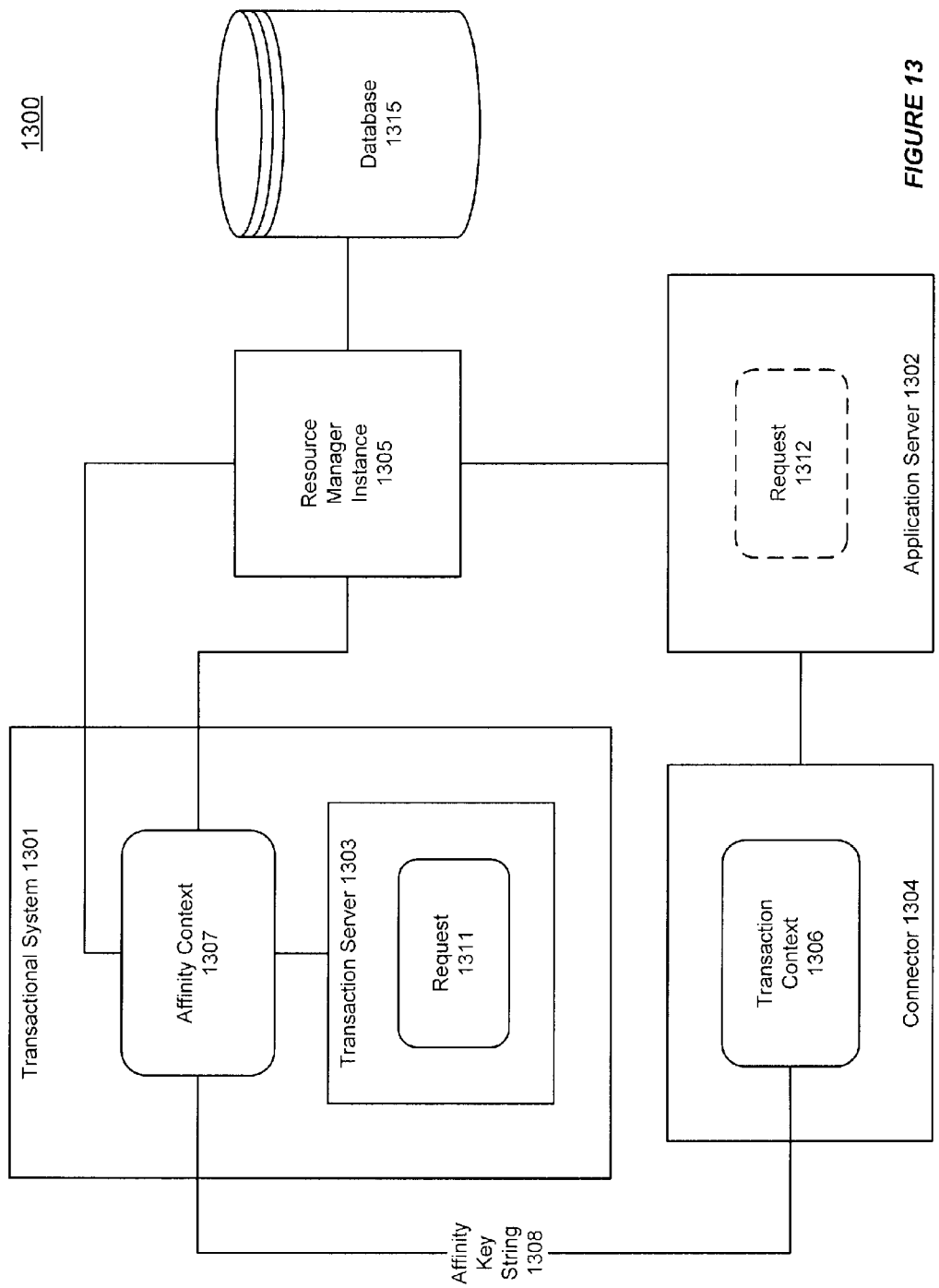
FIG. 13 shows an illustration of propagating an affinity context to an application server in a transactional environment, in accordance with an embodiment of the invention.

FIG. 13 shows an illustration of propagating an affinity context to an application server in a transactional environment, in accordance with an embodiment of the invention. As shown in FIG. 13, a transactional system 1301 in a transactional environment 1300 can support transaction processing using one or more resource manager (RMs), e.g. a RM instance 1305 that is associated with a database 1315.

In accordance with an embodiment of the invention, the system can route a request 1311 for a database connection to a transactional server 1303 (e.g. using the default routing policy). Additionally, the system can assign an affinity context 1307 that indicates the RM instance 1305 to the transactional server 1303.

Furthermore, the transactional system 1301 (e.g. a TUXEDO TDomain) can propagate the affinity context 1307 information to an application server 1302 (e.g. a WEBLOGIC application server) via an affinity key string 1308. For example, the affinity context 1307 can be exchanged between the transactional system 1301 and the application server 1302, via a connector 1304 (e.g. a TUXEDO WTC).

When the transactional system 1301 sends a request to the connector 1304, the transactional system 1301 can translate the affinity context 1307 into the affinity key string 1308. When the connector 1304 receives the request from the transactional system 1301, the connector 1304 can translate the affinity key string 1308 into the transaction context 1306 that can be used by the application server 1302.

When the connector 1304 sends a request to the transactional system 1301, the connector 1304 can obtain affinity context from the transaction context 1306 associated with the application server 1302. When the transactional system 1301 receives the request from the connector 1304, the transactional system 1301 can translate the affinity key string 1308 into the affinity context 1307.

Thus, one or more subsequent requests, e.g. the request 1312, in the application server 1302 can be directed to the RM instance 1305 based on the affinity context 1307.

Figure 14:
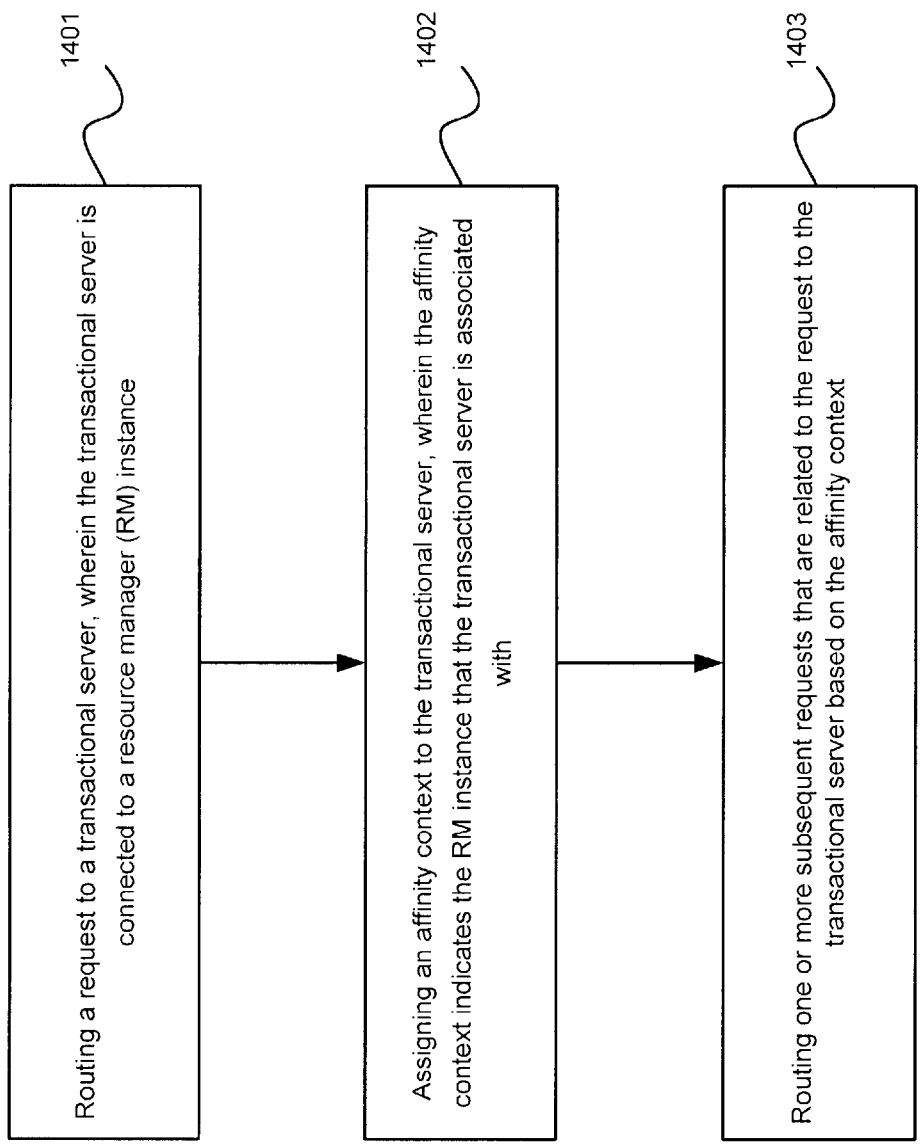
FIG. 14 illustrates an exemplary flow chart for supporting transaction affinity based on instance awareness in a transactional environment, in accordance with an embodiment of the invention.

FIG. 14 illustrates an exemplary flow chart for supporting transaction affinity based on instance awareness in a transactional environment, in accordance with an embodiment of the invention. As shown in FIG. 14, at step 1401, the system can route a request to a transactional server, wherein the transactional server is connected to a resource manager (RM) instance. Then, at step 1402, the system can assign an affinity context to the transactional server, wherein the affinity context indicates the RM instance that the transactional server is associated with. Furthermore, at step 1403, the system can route one or more subsequent requests that are related to the request to the transactional server based on the affinity context.

Common Transaction Identifier (XID)

Figure 15:
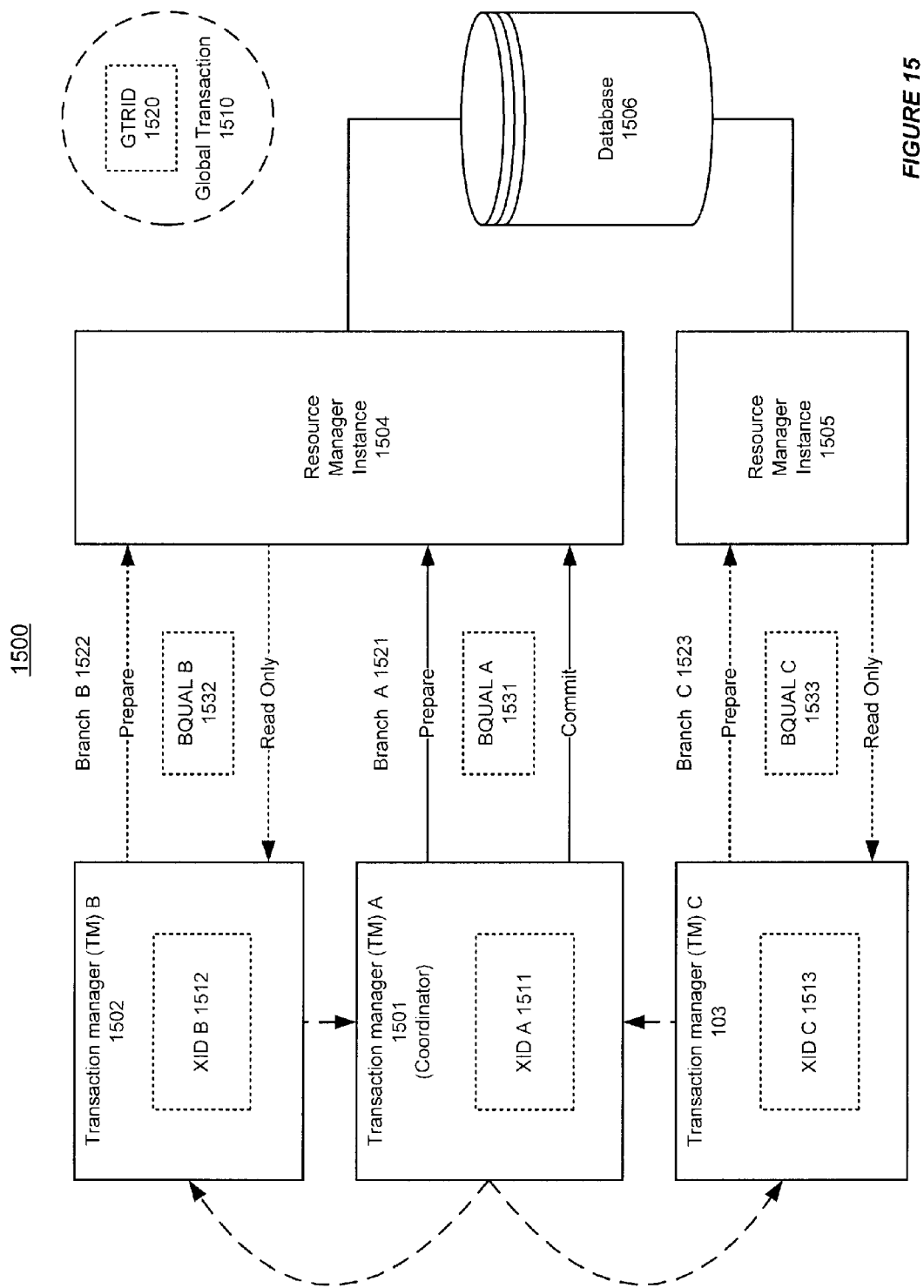
FIG. 15 shows an illustration of processing a global transaction in a transactional environment using different transaction identifiers (XIDs), in accordance with an embodiment of the invention.

FIG. 15 shows an illustration of processing a global transaction in a transactional environment using different transaction identifiers (XIDs), in accordance with an embodiment of the invention. As shown in FIG. 15, a transactional system 1500 can support the processing of a global transaction 1510 using different resource manager (RM) instances, e.g. RM instances 1504-1505 that connect to a database 1506.

In accordance with an embodiment of the invention, the global transaction 1510 can be associated with a global transaction identifier (GTRID) 1520. Within the global transaction 1510, the involved transactional servers in the same group can share one transaction branch, while the transactional servers in different groups may use different transaction branches.

As shown in FIG. 15, the transactional system 1500 may use multiple branches, e.g. branches A-C 1521-1523, for processing the global transaction 1510. Each of the branches A-C 1521-1523 can be associated with a branch qualifier, e.g. BQUALs A-C 1531-1533.

In accordance with an embodiment of the invention, the transactional system 1500 can use different transactional managers (TMs), e.g. TMs A-C 1501-1503, for managing the processing of the global transaction 1510 on different branches A-C 1521-1523.

For example, TM A 1501, which is associated with a transaction identifier (XID) A 1511, can be responsible for managing the processing of the global transaction 1510 on the branch A 1521. TM B 1502, which is associated with a transaction identifier (XID) B 1512, can be responsible for managing the processing of the global transaction 1510 on the branch B 1522. TM C 1503, which is associated with a transaction identifier (XID) C 1513, can be responsible for managing the processing of the global transaction 1510 on branch C 1523.

As shown in FIG. 15, the XIDs A-C 1511-1513 for the different branches A-C 1521-1523 in a global transaction 1510 can share the same GTRID 1520 (and format ID), and may have different branch qualifiers (i.e. the BQUALs A-C 1531-1533).

In accordance with an embodiment of the invention, the system can invoke a two-phase commit (2PC) process on the global transaction 1510, when more than one groups of transactional servers is involved in the global transaction 1510.

As shown in FIG. 15, the system may use the 2PC model to process the global transaction 1510, even when different participated transactional groups (e.g. TMs A-B 1501-1502) in a global transaction 1510 are in fact associated with same RM instance 1504.

In accordance with an embodiment of the invention, the system can improve the performance of processing the global transaction 1510 via using a common XID when more than one group runs on the same resource manager instance 1504.

Figure 16:
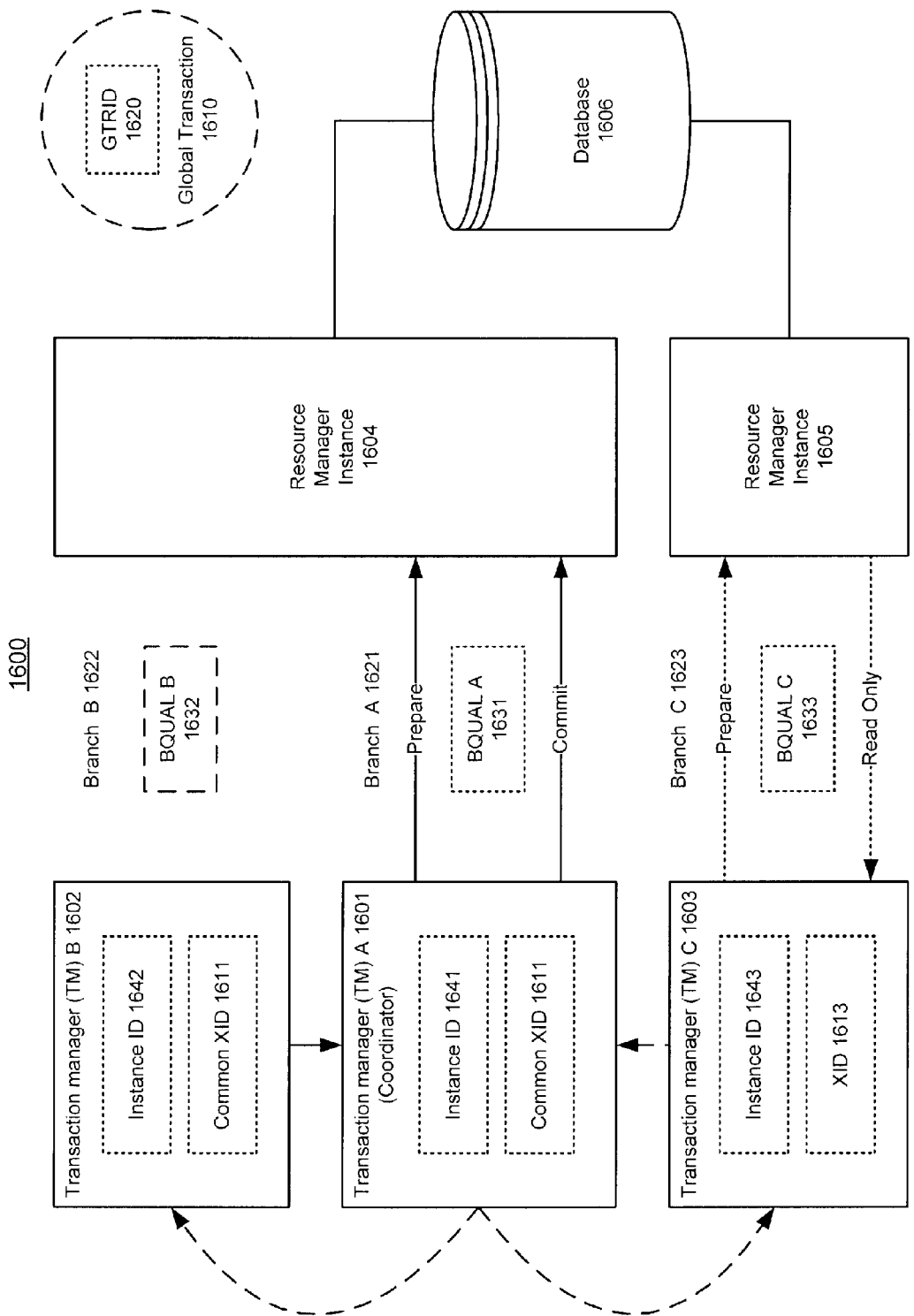
FIG. 16 shows an illustration of processing a global transaction in a transactional environment using a common transaction identifier (XID), in accordance with an embodiment of the invention.

FIG. 16 shows an illustration of processing a global transaction in a transactional environment using a common XID, in accordance with an embodiment of the invention. As shown in FIG. 16, a transactional system 1600 can support the processing of a global transaction 1610, which is associated with the GRTID 1620, using the resource manager (RM) instances 1604-1605 that connect to a database 1606.

Furthermore, the transactional system 1600 can use the transactional managers (TMs) A-C 1601-1603 to manage the processing of the global transaction 1610 on different transactional application servers in the different transaction groups (e.g. branches A-C 1621-1623).

In accordance with an embodiment of the invention, each of the resource managers (RMs) 1604-1605 can be uniquely identified, e.g. based on the database name, the server name and the instance name. Based on the database instance awareness capability, a transactional server in the transactional system 1600 is able to know which RM instance that it is currently connecting to.

As shown in FIG. 16, the transactional system 1600 can include a coordinator, such as the TM A 1601. The coordinator TM A 1601 is associated with an instance ID 1641 that identifies the RM instance 1604.

Additionally, the global transaction 1610 can include one or more participating servers (e.g. the participant TMs B-C 1602-1603), which may be located on the local server node where the coordinator 1601 is located or may be located at remote server nodes. Each of the participant TMs B-C 1602-1603 can also be associated with an instance ID (e.g. instance IDs 1642-1643) that identifies the RM instance that it connects to.

In accordance with an embodiment of the invention, when the common XID feature is enabled for processing the global transaction 1610, the XID 1611 for the coordinator TM A 1601 can be shared within the global transaction 1610 (i.e. the XID 1611 is used as a common XID). Thus, a transactional application that involves multiple groups and runs on a clustered database, such as an ORACLE® database, can improve the transaction performance by taking advantage of the database instance awareness.

As shown in FIG. 16, the coordinator TM A 1601 for the global transaction 1610 can propagate various types of information, such as the XID 1611 and the instance ID 1641, to different participant TMs B-C 1602-1603, within the life cycle of the global transaction 1610.

Furthermore, each of the participant TMs B-C 1602-1603 can determine whether it shares the same RM with the coordinator TM A 1601 by comparing the received instance ID 1641 with its own instance ID. If the instance IDs are the same, the participant TMs B-C 1602-1603, can mark itself as a common-XID server (or group).

For example, the system may find a match on the branch B 1622, since the TM B 1602 shares the same RM instance 1604 with the TM A 1601. Thus, the TM B 1602 can use the common XID 1611 instead of its own XID for supporting transaction processing. Then, the TM B 1602 can notify the coordinator TM A 1601 that it uses the common XID 1611. In such a case, when the coordinator TM A 1601 operates to commit or rollback the global transaction 1610, the system can ignore the branch B 1622, since it uses the common XID 1611 (which is based on the BQUAL A 1631).

On the other hand, the system may not find a match on the branch C 1623 (which uses the XID C 1613 and BQUAL C 1633), since the TM C 1603 is associated with a different RM 1605 (with an instance ID 1643). Optionally, the TM C 1603 can notify the coordinator TM A 1601 that it does not use the common XID 1611. Then, the system can process the transaction branch C 1623 according to the two-phase commit (2PC) processing model.

In accordance with an embodiment of the invention, the different common-XID groups, i.e., the groups of transactional servers that are associated with the same RM instance 1604 with the coordinator 1601, can access the RM instance 1604 via the common XID 1611.

Furthermore, when the commit request is invoked, the coordinator 1601 may not send any messages to the local common-XID groups. The system can change the state of each local common-XID group to read-only at once. Also, the remote common-XID groups can receive the prepare request from the coordinator 1601 and may change its state to read-only without any real database operation. Thus, the system may only need to prepare/commit one of these groups (e.g. the coordinator's group).

Additionally, the system can change a common-XID group to become a non-common-XID group, if the instance ID changes. For example, if branch B 1622 changes to use another RM instance, then the system can invoke a two-phase commit (2PC) process instead (e.g. based on the BQUAL B 1632).

Figure 17:
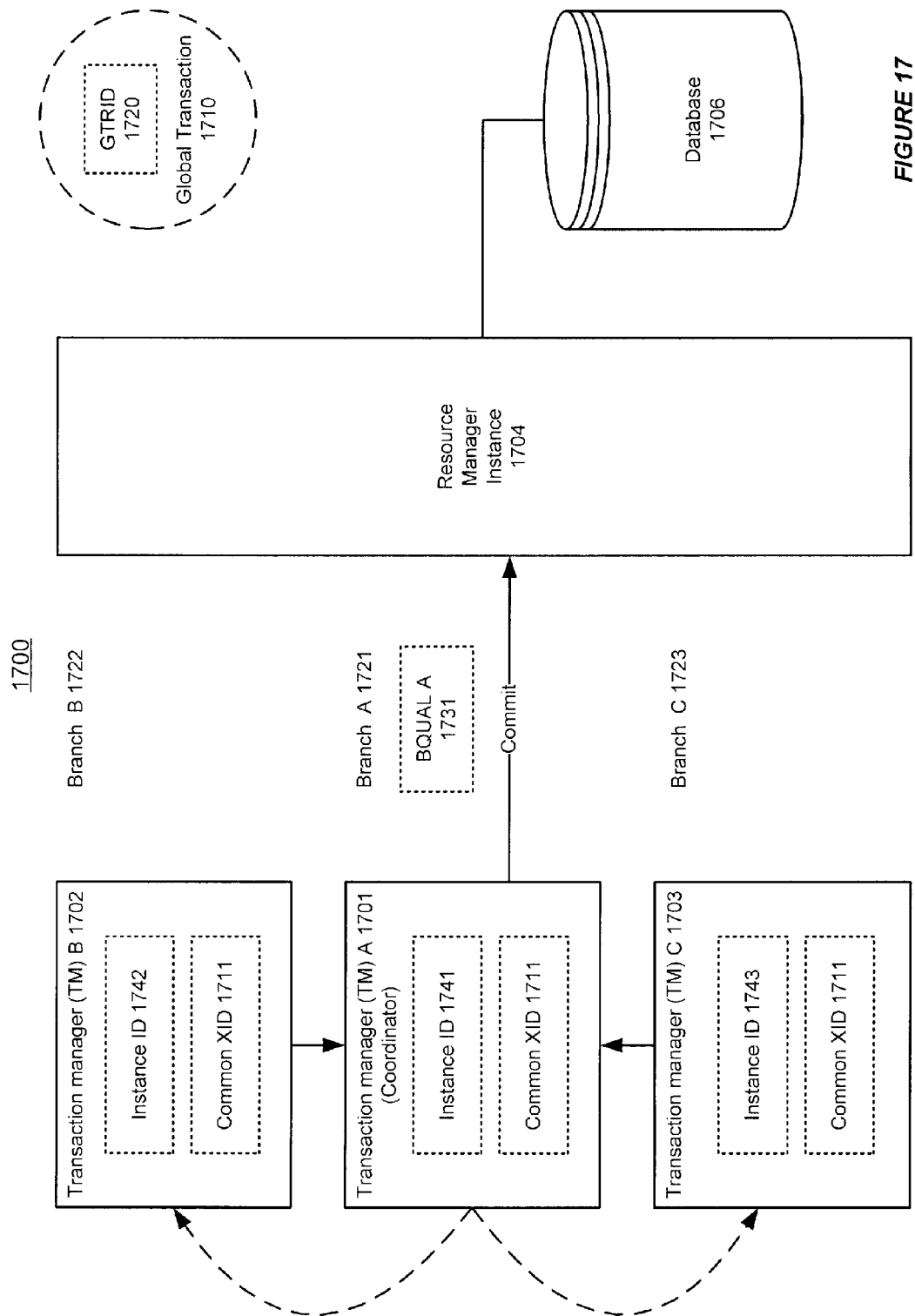
FIG. 17 shows an illustration of supporting a one-phase commit (1PC) processing model based on database instance awareness in a transactional environment, in accordance with an embodiment of the invention.

FIG. 17 shows an illustration of supporting a one-phase commit (1PC) processing model based on database instance awareness in a transactional environment, in accordance with an embodiment of the invention. As shown in FIG. 17, a transactional system 1700 can support the processing of a global transaction 1710, which is associated with the GRTID 1720, using the resource manager (RM) instance 1704 that connects to a database 1706.

The transactional system 1701 can include a plurality of transactional managers (TMs) A-C 1701-1703, which are used to manage the processing of the global transaction 1710 in different transactional groups (i.e. branches A-C 1721-1723).

Furthermore, the TMs A-C 1701-1703 can manage the processing of the global transaction 1710 based on a single resource manager (RM) instance 1704. Each of the TMs A-C 1701-1703 can maintain an instance identifier (ID), e.g. the instance IDs 1741-1743.

As shown in FIG. 17, the transactional system 1700 can include a coordinator (e.g. the TM A 1701). The coordinator TM A 1701 for the global transaction 1710 can propagate various types of information, such as the common XID 1711 and the instance ID 1741, to the different participating transactional servers (e.g. the TMs B-C 1702-1703), within the life cycle of the global transaction 1710.

In accordance with an embodiment of the invention, based on the transaction affinity capability, the system can route all related requests in the global transaction 1710 to the same RM instance 1704. Furthermore, based on the instance awareness capability, the TMs A-C 1701-1703 are able to know that only a single RM instance 1704 is used in the global transaction 1710, since the different instance IDs 1741-1743 all identify the same RM instance 1704. Thus, the coordinator TM A 1701 can uses the common XID 1711 (e.g. its own XID that is based on the BQUAL A 1731 and the GRTID 1720) for coordinating the global transaction 1710 in the transactional environment 1700.

As shown in FIG. 17, the coordinator TM A 1701 may not send any "prepare/commit" request to other groups at the commit stage, since they are all common-XID groups. Furthermore, the system can take advantage of the one-phase commit (1PC) processing model.

In accordance with an embodiment of the invention, the read-only one-phase commit optimization can significantly improve the system performance. It can perform 1 PC processing on the reserved group if all other groups returns read-only. The performance can be improved when all branches of the global transaction are tightly coupled, e.g. in the same instance or the same RAC.

For example, a transactional environment 1700 may have N (where N>1) participated groups for processing the global transaction 1710. Among them, M (where M<N) participated groups may have the same instance ID as that of the coordinator.

Using the two-phase commit (2PC) processing model with no database instance awareness, the system may perform N prepare operations and one commit operation on a database (e.g. as shown in FIG. 15). Also, the system may need to write a transaction log.

Alternatively, based on the database instance awareness (e.g. as shown in FIG. 16), the system may need to perform N-M prepare operations and one commit operation on a database (with M prepare operations reduced).

Furthermore, when M=N−1, which indicates that all other participated groups in the global transaction can share the same transaction branch with the coordinator. Then, there is only one branch in processing the global transaction. The system may only need to perform one commit operation, with N (or M+1) prepare operations reduced. Also, the system may not need to write a transaction log.

Figure 18:
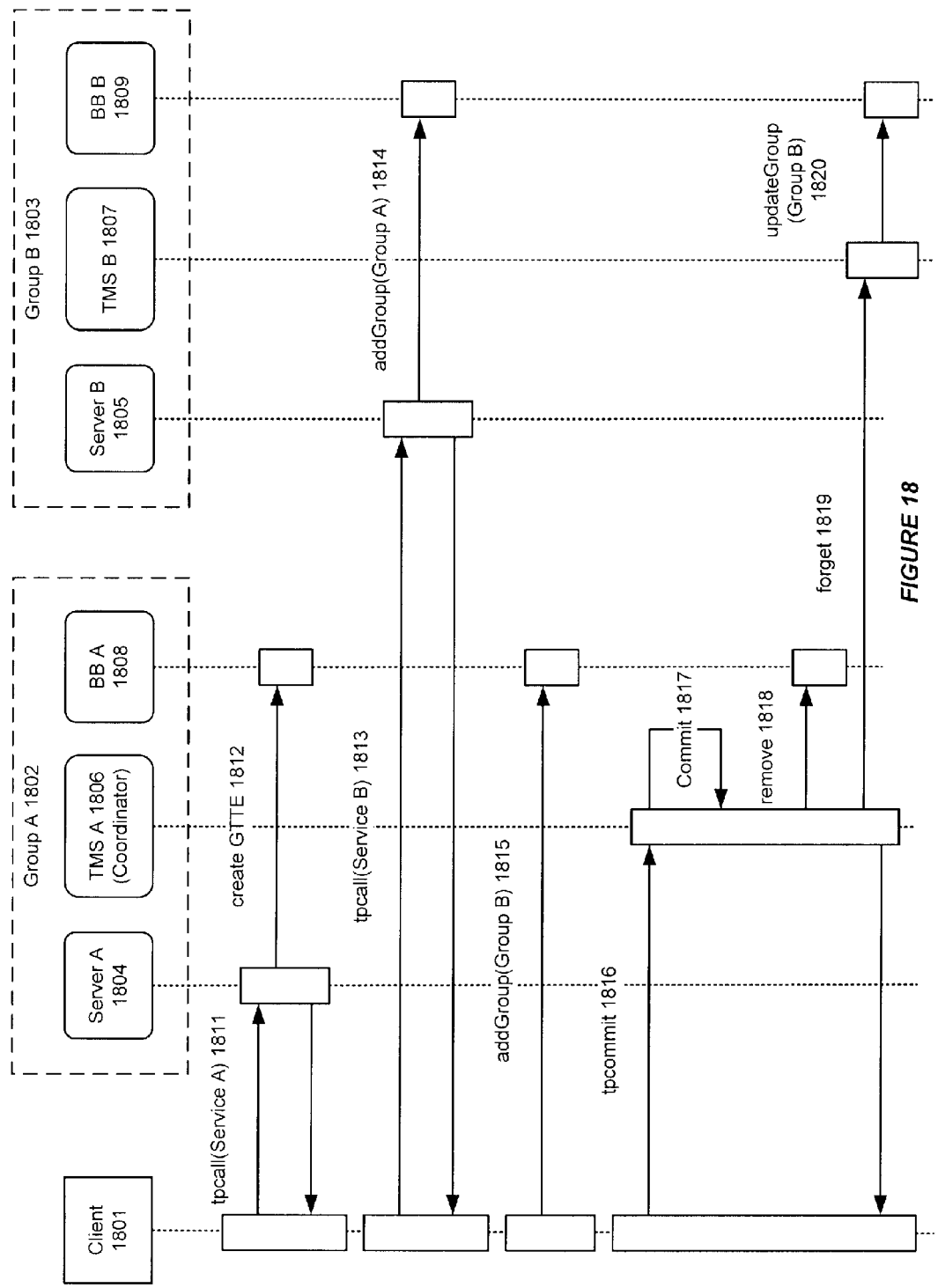
FIG. 18 shows an illustration of processing a global transaction based on database instance awareness in a transactional environment, in accordance with an embodiment of the invention.

FIG. 18 shows an illustration of processing a global transaction based on database instance awareness in a transactional middleware environment, in accordance with an embodiment of the invention. As shown in FIG. 18, a transactional system, e.g. an ORACLE® TUXEDO system, can support the processing of a global transaction using multiple transactional groups, e.g. TUXEDO groups A-B 1802-1803.

Furthermore, each of the TUXEDO groups A-B 1802-1803 can have a set of transaction manager servers (TMS). For example, group A 1802 includes a server A 1804 and a TMS A 1806, which can act as a coordinator. Additionally, group A 1802 can include a shared memory, e.g. a TUXEDO bulletin board (BB) A 1808. Furthermore, group B 1803 includes a server B 1805 and a TMS B 1807, and a shared memory, e.g. a TUXEDO BB B 1809.

In the example as shown in FIG. 18, at step 1811, the client 1801 can access a service (e.g. Service A) on the server A 1804 by invoking a function call, tpcall (Service A). Then, at step 1812, the server A 1804 can create related global transaction table entries (GTTEs) in the BB A 1808.

Additionally, at step 1813, the client 1801 can access another service (e.g. Service B) on the server B 1805 by invoking a function call, tpcall (Service B). At step 1814, the server A 1804 can add the related information about group A 1802 into the BB B 1809. Also, at step 1815, the client 1801 can add the related information about group B 1803 into the BB A 1808.

Furthermore, at step 1816, the client 1801 can request to commit the transaction by invoking a function call, tpcommit( ). TUXEDO can invoke 1 PC directly on the global transaction if all groups involved in the global transaction run on the same RM instance. At step 1817, the coordinator TMS A 1806 can proceed to commit the global transaction.

If the 1PC call succeeds, at step 1818, the coordinator TMS A 1806 can remove the GTTE in the local node. Then, at step 1819, the coordinator 1806 can notify the Group B 1803, a remote common-XID group, to forget its branch. Finally, at step 1820, the TMS B 1807 can update the BB B 1809.

Figure 19:
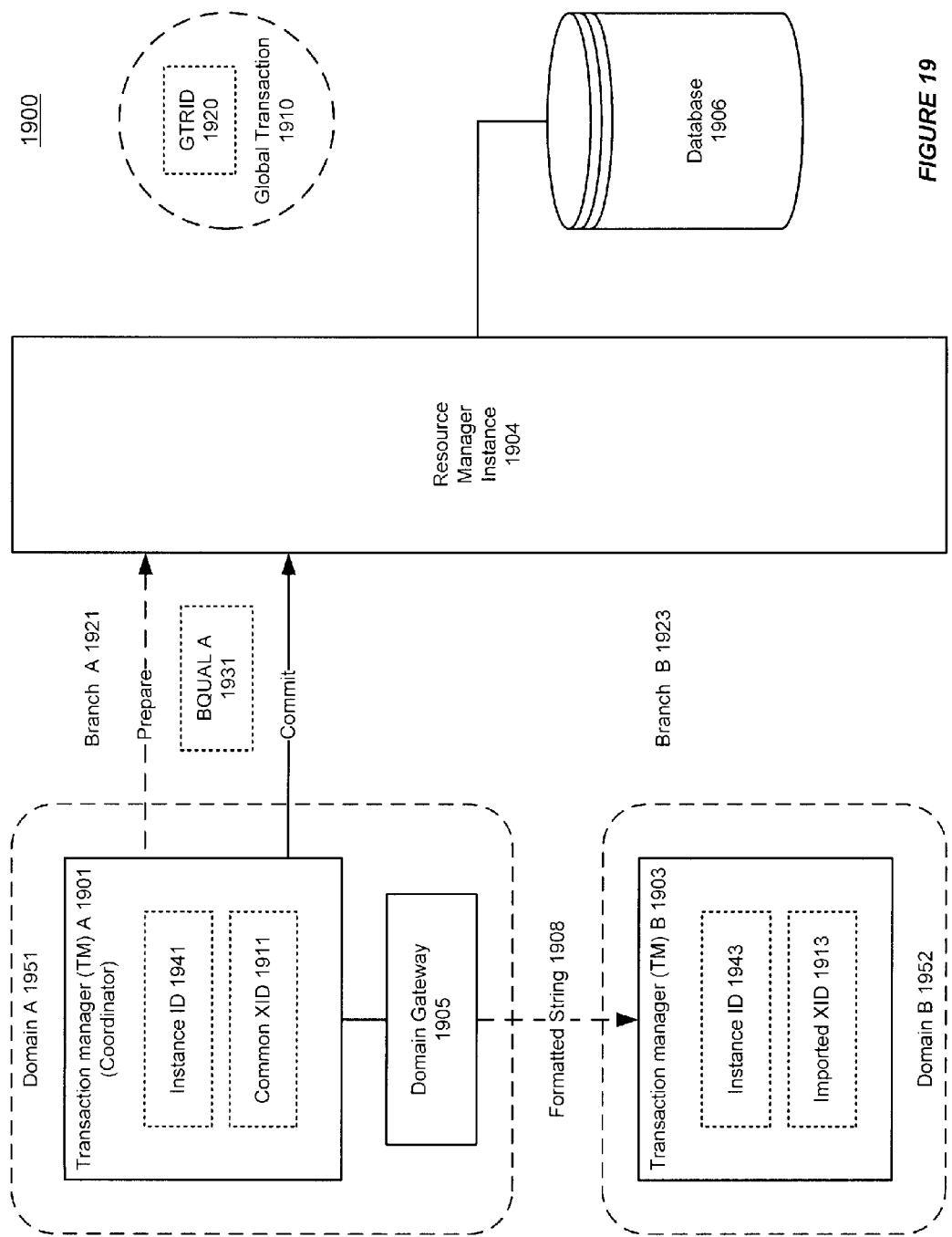
FIG. 19 shows an illustration of processing a global transaction across multiple domains in a transactional environment using a common XID, in accordance with an embodiment of the invention.

FIG. 19 shows an illustration of processing a global transaction across multiple domains in a transactional environment using a common XID, in accordance with an embodiment of the invention. As shown in FIG. 19, a transactional system 1900 can support the processing of a global transaction 1910 across multiple domains, e.g. domains A-B 1951-1952, based on the resource manager (RM) instance 1904 that connect to a database 1906.

Additionally, the different branches A-B 1921-1923 can share a GTRID 1920 in the transactional system 1900. The coordinator TM A 1901 in domain A 1951 can propagate the transaction identifier (XID) 1911 and the instance information based on the instance ID 1941 to the remote domain B 1952.

In accordance with an embodiment of the invention, the instance ID 1941, which is unique within the domain A 1951, may be different in different domains (e.g. the domain B 1952), due to the different server booting up sequences.

As shown in FIG. 19, instead of propagating the instance ID 1941 crossing domains directly, the coordinator TM A 1901 can convert the instance ID 1941 into a formatted string 1908, before being propagated across domains. For example, the formatted string 1908 can include the database name, the server name and the instance name.

Additionally, a domain gateway server 1905 can be used for supporting the communication between the local domain A 1951 and the remote domain B 1952. The outbound interface of the domain gateway server 1905 can map the instance information from the instance ID 1941 into the formatted string 1908. The inbound of the domain gateway server 1905 can map the instance information from the formatted string 1908 into the instance ID 1941.

For example, in TUXEDO, the user may divide the TUXEDO groups into different domains for business reasons. A gateway server, such as the GWTDOMAIN server, can be used to support the communication between the different domains. Furthermore, the GWTDOMAIN server in the coordinator domain can function as a proxy. Additionally, the GWTDOMAIN server can be configured to use a common XID, when all involved servers in the other domains through the GWTDOMAIN server are set to use the common XID.

In accordance with an embodiment of the invention, the remote domain B 1952 can store the common XID 1911 as an imported XID 1913. As shown in FIG. 19, the branch B 1923 (i.e. a common-XID group) can use the imported XID 1943 for accessing the database, if the imported XID 1913 exists and the BQUAL A 1931 associated with the imported XID 1913 is valid.

In accordance with an embodiment of the invention, based on database instance awareness, the system can also take advantage of one-phase commit (1PC) model in processing an inter-domain transaction, when the inter-domain transaction involves a single RM instance.

Figure 20:
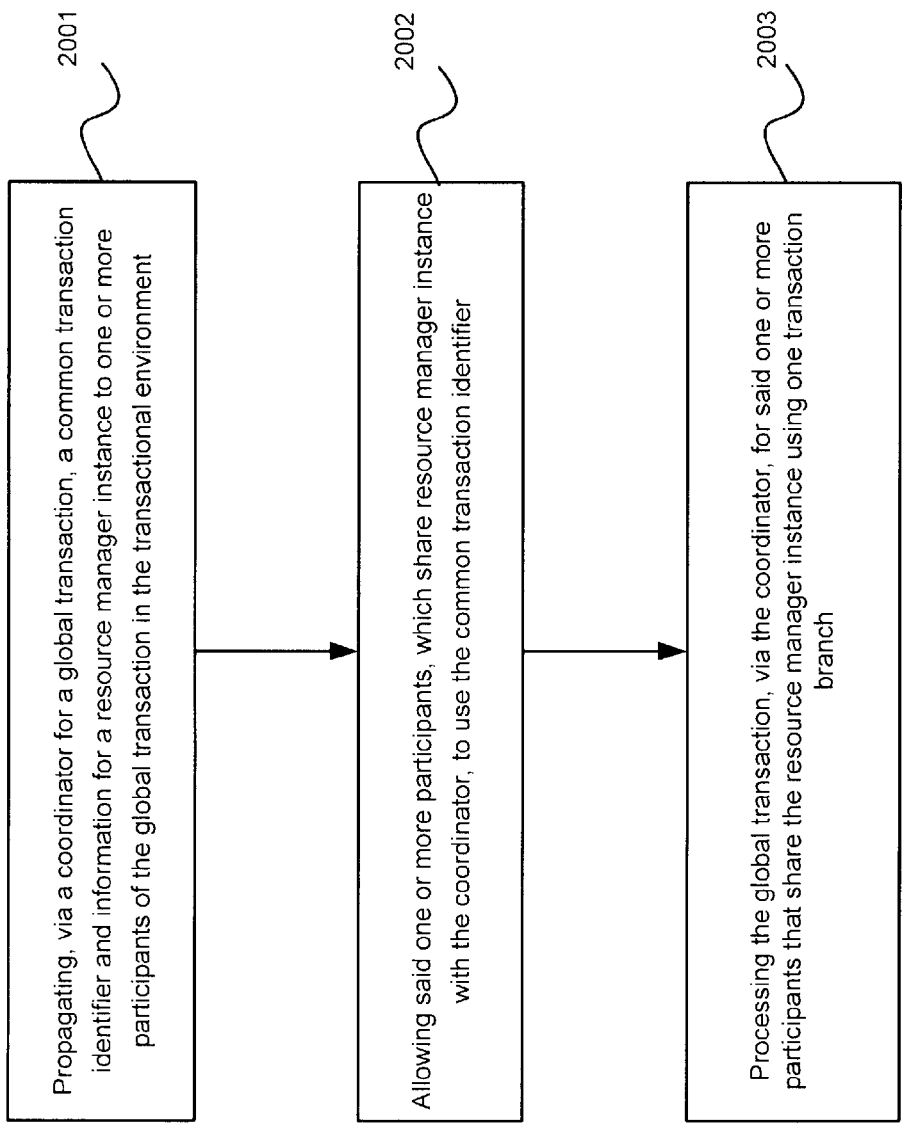
FIG. 20 illustrates an exemplary flow chart for processing a global transaction in a transactional environment using a common XID, in accordance with an embodiment of the invention.

FIG. 20 illustrates an exemplary flow chart for processing a global transaction in a transactional environment using a common XID, in accordance with an embodiment of the invention. As shown in FIG. 20, at step 2001, a coordinator for the global transaction can propagate a common transaction identifier and information for a resource manager instance to one or more participants of the global transaction in the transactional environment. Then, at step 2002, the system allows said one or more participants, which share resource manager instance with the coordinator, to use the common transaction identifier. Furthermore, at step 2003, the coordinator can process the global transaction for said one or more participants that share the resource manager instance using one transaction branch.

Many features of the present invention can be performed in, using, or with the assistance of hardware, software, firmware, or combinations thereof. Consequently, features of the present invention may be implemented using a processing system (e.g., including one or more processors).

Features of the present invention can be implemented in, using, or with the assistance of a computer program product which is a storage medium (media) or computer readable medium (media) having instructions stored thereon/in which can be used to program a processing system to perform any of the features presented herein. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems and execution environments/containers.

Features of the invention may also be implemented in hardware using, for example, hardware components such as application specific integrated circuits (ASICs). Implementation of the hardware state machine so as to perform the functions described herein will be apparent to persons skilled in the relevant art.

Additionally, the present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks illustrating the performance of specified functions and relationships thereof. The boundaries of these functional building blocks have often been arbitrarily defined herein for the convenience of the description. Alternate boundaries can be defined so long as the specified functions and relationships thereof are appropriately performed. Any such alternate boundaries are thus within the scope and spirit of the invention.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A method for supporting transaction processing in a transactional system comprising a plurality of transactional servers, and a clustered database comprising a plurality of resource manager (RM) instances, the method comprising:
receiving a plurality of requests to the transactional system;
routing each of the plurality of requests to a transactional server of the plurality of transactional servers, wherein the transactional server is connected to an RM instance of the plurality of RM instances;
establishing for each of the plurality of requests an affinity context identifying a transactional server of the plurality of transactional servers, a database name, a database service name, an RM instance name associated with transactions responsive to said each of the plurality of requests;
storing in a shared memory the affinity contexts for said each of the plurality of requests; receiving a subsequent request to the transactional system;
routing the subsequent request to a particular transactional server of the plurality of transactional servers using transaction affinity routing policy which identifies a relationship between the subsequent transaction and the stored affinity contexts established for the plurality of requests; and
wherein said transaction routing policy:
(a) routes the subsequent request to the particular transactional server associated with an affinity context which includes a same RM instance name, same database name, and same database service name as the subsequent request,
(b) if no particular server is identified in step (a) routes the subsequent request to the particular transaction server associated with an affinity context including a same database name and same database service name as the subsequent request,
(c) if no particular server is identified in steps (a) and (b) routes the subsequent request to the particular transaction server associated with an affinity context including a same database name and same RM instance name as the subsequent request,
(d) if no particular server is identified in steps (a), (b) and (c) routes the subsequent request to the particular transaction server associated with an affinity context including a same database name as the subsequent request, and
(e) if no particular server is identified in steps (a), (b), (c) and (d) routes the subsequent request to the particular transaction server using a load balancing function.

2. The method of claim 1, further comprising:
allowing said plurality of requests and said subsequent request to be associated with a client context.

3. The method of claim 1, further comprising:
propagating the affinity contexts established for each of the plurality of requests in the transactional system using messages.

4. The method of claim 1, further comprising:
updating a transaction context for the subsequent request based on a message received from another transactional server comprising an affinity context established for a related one of the plurality of requests.

5. The method of claim 1, further comprising:
updating a transaction context for the subsequent request using an affinity context string to transfer the affinity context from a transactional domain to another transactional domain.

6. The method of claim 1, further comprising:
using a connector to transfer the affinity contexts from a transactional system to an application server.

7. A system for supporting processing a global transaction in a transactional middleware environment, comprising:
one or more microprocessors;
a transactional system comprising a plurality of transactional servers running on the one or more microprocessors, and a clustered database comprising a plurality of resource manager (RM) instances, wherein the transactional system operates to perform steps comprising
receiving a plurality of requests to the transactional system;
routing each of the plurality of requests to a transactional server of the plurality of transactional servers, wherein the transactional server is connected to an RM instance of the plurality of RM instances;
establishing for each of the plurality of requests an affinity context identifying a transactional server of the plurality of transactional servers, a database name, a database service name, an RM instance name associated with transactions responsive to said each of the plurality of requests;
storing in a shared memory the affinity contexts for said each of the plurality of requests;
receiving a subsequent request to the transactional system;
routing the subsequent request to a particular transactional server of the plurality of transactional servers using transaction affinity routing policy which identifies a relationship between the subsequent transaction and the stored affinity contexts established for the plurality of requests; and
wherein said transaction routing policy:
(a) routes the subsequent request to the particular transactional server associated with an affinity context which includes a same RM instance name, same database name, and same database service name as the subsequent request,
(b) if no particular server is identified in step (a) routes the subsequent request to the particular transaction server associated with an affinity context including a same database name and same database service name as the subsequent request,
(c) if no particular server is identified in steps (a) and (b) routes the subsequent request to the particular transaction server associated with an affinity context including a same database name and same RM instance name as the subsequent request,
(d) if no particular server is identified in steps (a), (b) and (c) routes the subsequent request to the particular transaction server associated with an affinity context including a same database name as the subsequent request, and
(e) if no particular server is identified in steps (a), (b), (c) and (d) routes the subsequent request to the particular transaction server using a load balancing function.

8. The system according to claim 7, wherein:
said plurality of requests and said subsequent request are associated with a client context.

9. The system according to claim 7, wherein:
the transactional system is configured to propagate the affinity contexts established for each of the plurality of requests in the transactional system using messages.

10. The system according to claim 7, wherein:
the transactional system is configured to update a transaction context for the subsequent request based on a message received from another transactional server comprising an affinity context established for a related one of the plurality of requests.

11. The system according to claim 7, wherein:
the transactional system is configured to use an affinity context string to transfer the affinity contexts from a transactional domain to another transactional domain.

12. The system according to claim 7, wherein:
said transaction routing policy is configured to use a connector to transfer the affinity contexts from a transactional system to an application server.

13. A non-transitory machine readable storage medium having instructions stored thereon for supporting transaction processing in a transactional system comprising a plurality of transactional servers, and a clustered database comprising a plurality of resource manager (RM) instances, which instructions, when executed, cause the transactional servers in the transactional system to perform steps comprising:
receiving a plurality of requests to the transactional system;
routing each of the plurality of requests to a transactional server of the plurality of transaction servers, wherein the transactional server is connected to an RM instance of the plurality of RM instances
establishing for each of the plurality of requests an affinity context identifying a transactional server of the plurality of transactional servers, a database name, a database service name, an RM instance name associated with transactions responsive to said each of the plurality of requests;
storing in a shared memory the affinity contexts for said each of the plurality of requests;
receiving a subsequent request to the transactional system;
routing the subsequent request to a particular transactional server of the plurality of transactional servers using transaction affinity routing policy which identifies a relationship between the subsequent transaction and the stored affinity contexts established for the plurality of requests; and
wherein said transaction routing policy:
  (a) routes the subsequent request to the particular transactional server associated with an affinity context which includes a same RM instance name, same database name, and same database service name as the subsequent request,
  (b) if no particular server is identified in step (a) routes the subsequent request to the particular transaction server associated with an affinity context including a same database name and same database service name as the subsequent request,
  (c) if no particular server is identified in steps (a) and (b) routes the subsequent request to the particular transaction server associated with an affinity context including a same database name and same RM instance name as the subsequent request,
  (d) if no particular server is identified in steps (a), (b) and (c) routes the subsequent request to the particular transaction server associated with an affinity context including a same database name as the subsequent request, and
  (e) if no particular server is identified in steps (a), (b), (c) and (d) routes the subsequent request to the particular transaction server using a load balancing function.

* * * * *

UNITED STATES PATENT AND TRADEMARK OFFICE
CERTIFICATE OF CORRECTION

PATENT NO. : 9,600,324 B2  
APPLICATION NO. : 14/587476  
DATED : March 21, 2017  
INVENTOR(S) : Shen et al.

Page 1 of 1

It is certified that error appears in the above-identified patent and that said Letters Patent is hereby corrected as shown below:

On the Title Page

On page 2, Column 2, item [56] under Other Publications, Line 27, delete "Wtih" and insert -- With --, therefor.

On page 2, Column 2, item [56] under Other Publications, Line 30, delete "Applicaiton" and insert -- Application --, therefor.

On page 2, Column 2, item [56] under Other Publications, Line 30, delete "Messafe" and insert -- Message --, therefor.

On page 2, Column 2, item [56] under Other Publications, Line 40, delete "Confereneces" and insert -- Conferences --, therefor.

On page 2, Column 2, item [56] under Other Publications, Line 42, delete "Softward" and insert -- Software --, therefor.

In the Specification

Column 3, Line 56, after "and" delete "Or".

Column 13, Line 65, delete "1 PC" and insert -- 1PC --, therefor.

Column 14, Line 54, delete "1 PC" and insert -- 1PC --, therefor.

In the Claims

Column 19, Line 31, Claim 13, delete "instances" and insert -- instances; --, therefor.

Signed and Sealed this  
Twenty-second Day of August, 2017

Joseph Matal  
*Performing the Functions and Duties of the*  
*Under Secretary of Commerce for Intellectual Property and*  
*Director of the United States Patent and Trademark Office*